US011761431B2

(12) United States Patent
Pedretti et al.

(10) Patent No.: US 11,761,431 B2
(45) Date of Patent: Sep. 19, 2023

(54) ELEVATOR CAGE FOR ENERGY STORAGE AND DELIVERY SYSTEM

(71) Applicant: Energy Vault, Inc., Westlake Village, CA (US)

(72) Inventors: Andrea Pedretti, Bellinzona (CH); Mauro Pedretti-Rodi, Canobbio (CH)

(73) Assignee: Energy Vault, Inc., Westlake Village, CA (US)

( * ) Notice: Subject to any disclaimer, the term of this patent is extended or adjusted under 35 U.S.C. 154(b) by 0 days.

(21) Appl. No.: 17/305,008

(22) Filed: Jun. 29, 2021

(65) Prior Publication Data

US 2021/0404445 A1    Dec. 30, 2021

Related U.S. Application Data

(60) Provisional application No. 63/046,187, filed on Jun. 30, 2020.

(51) Int. Cl.
*F03G 3/00* (2006.01)
*H02K 7/18* (2006.01)
*B66C 17/06* (2006.01)

(52) U.S. Cl.
CPC .............. *F03G 3/094* (2021.08); *B66C 17/06* (2013.01); *F03G 3/00* (2013.01); *H02K 7/1853* (2013.01)

(58) Field of Classification Search
CPC . F03G 3/094; F03G 3/00; B66C 17/06; B66C 23/28; B66C 13/28; H02K 7/1853
See application file for complete search history.

(56) References Cited

U.S. PATENT DOCUMENTS

| | | | |
|---|---|---|---|
| 1,720,732 | A | 7/1929 | Jongedyk |
| 1,822,432 | A | 9/1931 | Bradley |
| 2,627,176 | A | 2/1953 | Levy |
| 2,924,484 | A | 2/1960 | Tolsma |
| 3,405,278 | A | 10/1968 | Ley |
| 4,018,021 | A | 4/1977 | Dow |
| 4,284,899 | A | 8/1981 | Bendiks |
| 4,381,839 | A | 5/1983 | Engler |
| 4,918,282 | A | 4/1990 | Cheek |
| 5,340,218 | A | 8/1994 | Cuthbertson |
| 5,888,043 | A | 3/1999 | Jatcko |

(Continued)

FOREIGN PATENT DOCUMENTS

| | | |
|---|---|---|
| CN | 103334887 A | 10/2013 |
| CN | 103867408 A | 6/2014 |

(Continued)

OTHER PUBLICATIONS

"A Weighting game," International Water Power & Dam Construction, Apr. 13, 2010, 8 pages.

(Continued)

*Primary Examiner* — Joseph Ortega
(74) *Attorney, Agent, or Firm* — Knobbe Martens Olson & Bear, LLP

(57) ABSTRACT

An elevator cage is used in an energy storage and delivery system to move blocks between a lower elevation of a tower and a higher elevation of a tower to store energy and to move blocks between a higher elevation of the tower and a lower elevation of the tower under force of gravity to generate electricity. The elevator cage removably receives a block thereon and supports the block on at least three sides.

15 Claims, 27 Drawing Sheets

(56) References Cited

U.S. PATENT DOCUMENTS

| | | |
|---|---|---|
| 6,282,859 B1 | 9/2001 | Van Der Heijden |
| 6,557,316 B2 | 5/2003 | Van Der Heijden |
| 6,866,815 B2 | 3/2005 | Gohres et al. |
| 6,955,015 B2 | 10/2005 | Manthei |
| 7,191,710 B2 | 3/2007 | Powell |
| 7,561,936 B2 | 7/2009 | Matsufuji |
| 7,712,326 B2 | 5/2010 | Jagusztyn et al. |
| 7,743,609 B1 | 6/2010 | Brostmeyer |
| 7,775,571 B2 | 8/2010 | Waisanen |
| 7,836,646 B2 | 11/2010 | Matsufuji |
| 7,886,537 B2 | 2/2011 | Jagusztyn et al. |
| 7,973,420 B2 | 7/2011 | Scott |
| 8,176,702 B2 | 5/2012 | Adam |
| 8,465,071 B2 | 6/2013 | Risi |
| 8,667,750 B2 | 3/2014 | Speer |
| 8,674,527 B2 | 3/2014 | Fyke et al. |
| 9,059,605 B2 | 6/2015 | Murray |
| 9,523,201 B2 | 12/2016 | Romanenko |
| 9,688,520 B1 | 6/2017 | Khalil |
| 10,683,851 B2 | 6/2020 | Pedretti et al. |
| 10,788,020 B2 | 9/2020 | Pedretti et al. |
| 10,830,216 B2 | 11/2020 | Pedretti et al. |
| 10,837,429 B2 | 11/2020 | Pedretti et al. |
| 10,961,051 B1 | 3/2021 | Lindbo et al. |
| 2002/0197135 A1 | 12/2002 | Amtzen |
| 2003/0009970 A1 | 1/2003 | MacDonald |
| 2003/0019828 A1 | 1/2003 | Choi |
| 2003/0215318 A1 | 11/2003 | Buzzoni |
| 2004/0020145 A1 | 2/2004 | Matsufuji |
| 2005/0252144 A1 | 11/2005 | Macdonald |
| 2007/0000246 A1 | 1/2007 | Prastitis |
| 2007/0186502 A1 | 8/2007 | Marsh |
| 2007/0193183 A1 | 8/2007 | Price |
| 2008/0098687 A1 | 5/2008 | Marsh |
| 2009/0077920 A1 | 3/2009 | Korman |
| 2009/0173027 A1 | 7/2009 | Bennett |
| 2009/0193808 A1 | 8/2009 | Fiske |
| 2009/0200814 A1 | 8/2009 | Hellgren |
| 2009/0231123 A1 | 9/2009 | Rowell et al. |
| 2009/0284021 A1 | 11/2009 | Scott |
| 2010/0283263 A1 | 11/2010 | Schilling |
| 2010/0301616 A1 | 12/2010 | Al-Khamis |
| 2011/0027107 A1 | 2/2011 | Bekken |
| 2011/0050158 A1 | 3/2011 | MacDonald et al. |
| 2011/0112731 A1 | 5/2011 | Harada |
| 2011/0123257 A1 | 5/2011 | Mills |
| 2011/0241356 A1 | 10/2011 | Khoshnevis |
| 2012/0306223 A1 | 12/2012 | Karlsson |
| 2013/0125540 A1 | 5/2013 | Vainonen |
| 2014/0271240 A1 | 9/2014 | Daily |
| 2015/0048622 A1 | 2/2015 | Schegerin |
| 2015/0130191 A1 | 5/2015 | Houvener |
| 2015/0285037 A1 | 10/2015 | Sadiq |
| 2016/0032586 A1 | 2/2016 | Radford |
| 2017/0030069 A1 | 2/2017 | Radford |
| 2017/0288457 A1 | 10/2017 | Peitzke et al. |
| 2020/0025181 A1 | 1/2020 | Pedretti et al. |
| 2020/0028379 A1 | 1/2020 | Pedretti et al. |
| 2020/0109703 A1 | 4/2020 | Bhargava |
| 2021/0188549 A1 | 6/2021 | Fjeldheim et al. |
| 2021/0198039 A1* | 7/2021 | Salichs ............... B65G 1/026 |
| 2021/0214100 A1 | 7/2021 | Austrheim |
| 2021/0214199 A1 | 7/2021 | Austrheim |
| 2021/0221618 A1 | 7/2021 | Austrheim |
| 2021/0397769 A1 | 12/2021 | Austrheim et al. |
| 2022/0002076 A1 | 1/2022 | Austrheim |
| 2022/0002077 A1 | 1/2022 | Austrheim et al. |
| 2022/0041372 A1 | 2/2022 | Austrheim |
| 2022/0073279 A1 | 3/2022 | Austrheim et al. |
| 2022/0097967 A1 | 3/2022 | Austrheim |
| 2022/0161662 A1 | 5/2022 | Fjeldheim |

FOREIGN PATENT DOCUMENTS

| | | | |
|---|---|---|---|
| DE | 21 52 879 A1 | 4/1973 | |
| DE | 12 79 906 | 10/1986 | |
| DE | 100 37 678 A1 | 2/2002 | |
| DE | 10 2010 014342 A1 | 10/2011 | |
| DE | 10 2011 119116 A1 | 5/2013 | |
| DE | 20 2012 102937 | 11/2013 | |
| EA | 27072 B1 | 6/2017 | |
| FR | 1 135 656 | 5/1957 | |
| FR | 2 812 865 A1 | 2/2002 | |
| GB | 946 930 A | 1/1964 | |
| GB | 2351066 A | 12/2000 | |
| GB | 2578805 A | 5/2020 | |
| GB | 2585124 A * | 12/2020 | ............... E21D 7/00 |
| JP | S648197 A | 1/1989 | |
| JP | 06-193553 | 7/1994 | |
| JP | 2001-163574 A | 6/2001 | |
| JP | 2006 022529 A | 1/2006 | |
| KR | 10-0570880 B1 | 4/2006 | |
| KR | 10-2009-0110891 A | 10/2009 | |
| SU | 481528 A1 | 8/1975 | |
| WO | WO 1992/018415 A1 | 10/1992 | |
| WO | WO 2013/005056 A1 | 1/2013 | |
| WO | WO 2018/184868 A2 | 10/2018 | |
| WO | WO 2020/040717 A1 | 2/2020 | |
| WO | WO 2021/255763 A1 | 12/2021 | |
| WO | WO 2021/260450 A1 | 12/2021 | |
| WO | WO-2021260450 A1 * | 12/2021 | |

OTHER PUBLICATIONS

Wood, Bruce; "Hanging Tomato Plants"; Mar. 4, 2009; retrieved May 9, 2013 using Internet Archive to view rubberingot.com.

International Search Report and Written Opinion dated Nov. 21, 2021, received in International Patent Application No. PCT/US2021/070783, in 21 pages.

* cited by examiner

ELEVATOR CAGE FOR ENERGY STORAGE AND DELIVERY SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 and should be considered a part of this specification.

BACKGROUND

Field

The invention is directed to an energy storage and delivery system, and more particularly to an elevator cage for use in an energy storage and delivery system that stores and releases energy via the vertical movement of blocks or bricks.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electrical grid. As used herein, the electrical grid is an interconnected network for delivery of electricity from producers to consumers and spans a large geographical region, including cities, states and/or countries.

In accordance with one aspect of the disclosure, an energy storage and delivery system is provided. An example energy storage and delivery system includes a crane and a plurality of blocks, where the crane is operable to move one or more blocks from a lower elevation to a higher elevation to store energy (e.g., via the potential energy of the block in the higher elevation) and operable to move one or more blocks from a higher elevation to a lower elevation to generate electricity (e.g., via the kinetic energy of the block when moved to the lower elevation).

In accordance with another aspect of the disclosure, a gravity driven power storage and delivery system is provided. An example gravity driven power storage and delivery system includes a bridge crane or elevator cage operable to store energy by moving one or more blocks from a lower elevation to a higher elevation and operable to generate electricity by moving one or more blocks from a higher elevation to a lower elevation under the force of gravity.

In accordance with another aspect of the disclosure, the energy storage and delivery system can in one example store solar power to produce off-hours electricity. The energy storage and delivery system can move a plurality of blocks from a lower elevation to a higher elevation to store solar energy as potential energy in the blocks during daylight hours when solar electricity is abundant. The energy storage system can then operate to move the blocks from the higher elevation to a lower elevation during nighttime to drive a generator to produce electricity for delivery to the power grid.

In accordance with another aspect of the disclosure a method for storing and generating electricity is provided. The method comprises operating a crane or elevator cage on a tower to move a plurality of blocks from a lower elevation on the tower to a higher elevation on the tower to store energy in the blocks, each of the blocks storing an amount of energy corresponding to a potential energy amount of the block. The method also comprises operating the crane or elevator cage to move the blocks from a higher elevation on the tower to a lower elevation on the tower under a force of gravity, thereby generating an amount of electricity corresponding to a kinetic energy amount of said one or more blocks when moved from the higher elevation to the lower elevation. The method includes moving the blocks so that the average load on the tower is approximately constant during operation of the crane or elevator cage.

In accordance with one aspect of the disclosure, an energy storage and delivery system is provided comprising one or more modules. Each module comprises a plurality of blocks and a frame having a vertical height above a foundation defined by a plurality of rows that extend horizontally. The frame includes an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section that is free of blocks, a pair of elevator shafts disposed on opposite ends of the plurality of rows, and an elevator cage movably disposed in each of the pair of elevator shafts and operatively coupled to an electric motor-generator, the elevator cage sized to receive and support one or more blocks therein. The elevator cage in each of the pair of elevator shafts is operable to move one or more blocks from alternating rows of the second set of rows to corresponding alternating rows of the first set of rows to store and amount of electrical energy corresponding to a potential energy amount of said blocks. The elevator cage in each of the pair of elevator shafts is operable to move one or more blocks from alternating rows of the first set of rows to corresponding alternating rows of the second set of rows under a force of gravity to generate an amount of electricity. The elevator cage moves said blocks between each of the second set of rows and each of the corresponding first set of rows along a same vertical distance.

In accordance with another aspect of the disclosure, an energy storage and delivery system is provided. The system comprises a plurality of blocks and a frame having a vertical height above a foundation defined by a plurality of rows that extend horizontally. The frame includes an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section that is free of blocks, and a pair of elevator shafts disposed on opposite ends of the plurality of rows. A trolley is movably coupled to each row in one or both of the first set of rows and the second set of rows, the trolley operable to travel beneath the blocks in the row and configured to lift a block for movement of said block horizontally along the row. An elevator cage is movably disposed in each of the pair of elevator shafts and operatively coupled to an electric motor-generator. The elevator cage is sized to receive a block from a row via the trolley and to support the block therein while moving along the elevator shaft. The elevator cage in each of the pair of elevator shafts is operable to move one or more blocks from alternating rows of the second set of rows to corresponding alternating rows of the first set of rows to store and amount of electrical energy corresponding to a potential energy amount of said blocks. The elevator cage in each of the pair of elevator shafts is operable to move one or more of the blocks from alternating rows of the first set of rows to corresponding alternating rows of the second set of rows under a force of gravity to generate an amount of electricity. The elevator cage moving said blocks between each of the second set of rows and each of the corresponding first set of rows along a same vertical distance.

In accordance with another aspect of the disclosure, a method for storing and generating electricity is provided. The method comprises operating a pair of elevator cages on opposite ends of a plurality of rows of a frame to move a plurality of blocks between a first set of rows in an upper section of the frame and a corresponding second set of rows in a lower section of the frame disposed below an intermediate section of the frame that is free of the blocks. Operating the pair of elevator cages includes moving with the pair of elevator cages one or more of the blocks from alternating rows of the second set of rows to corresponding alternating rows of the first set of rows to store and amount of electrical energy corresponding to a potential energy amount of said blocks. Operating the pair of elevator cages also includes moving with the pair of elevator cages one or more of the blocks from alternating rows of the first set of rows to corresponding alternating rows of the second set of rows under a force of gravity to generate an amount of electricity via an electric motor-generator electrically coupled to the elevator cages. The elevator cages move said blocks between each of the second set of rows and each of the corresponding first set of rows by an equal vertical distance.

In accordance with another aspect of the disclosure, a method for storing and generating electricity is provided. The method comprises horizontally moving one or more blocks along alternating rows of a first set of rows in an upper section of a frame with a trolley toward elevator cages on opposite ends of the rows. The method also comprises operating the elevator cages to vertically move the one or more blocks past an intermediate section of the frame to corresponding alternating rows of a second set of rows of the frame under a force of gravity to generate an amount of electricity via an electric motor-generator electrically coupled to the elevator cages. The elevator cages move said blocks between the alternating rows of the first set of rows and each of the corresponding alternating second set of rows by an equal vertical distance.

In accordance with another aspect of the disclosure, an energy storage and delivery system is provided. The system comprises a plurality of blocks and a frame extending between a bottom end of the frame and one or more rails at a top end of the frame. The frame has a plurality of columns between the bottom end and the top end. Each column is configured to movably support a set of the blocks between a front pillar of the column and a rear pillar of the column at different vertical locations of the column via one or more posts attached to the front and rear pillars that engage corresponding posts of the blocks such that the blocks in a column are maintained spaced from each other. The system also comprises one or more cranes movably mounted to the one or more rails and configured to travel horizontally along the rails over one of more of the columns. The system also comprises an electric motor-generator electrically coupled to the one or more cranes. The one or more cranes are operable to couple to one or more of the blocks in a column to move said one or more blocks from a lower elevation of the column to a higher elevation of the column to store an amount of electrical energy corresponding to a potential energy amount of said one or more blocks, and to move said one or more blocks from a higher elevation of the column to a lower elevation of the column under a force of gravity to generate an amount of electricity via the electric motor-generator. The vertical distance between the lower elevation and the higher elevation each of the blocks is the same.

In accordance with another aspect of the disclosure, a method for storing and generating electricity is provided. The method comprises operating a crane movably mounted to one or more rails at a top of a frame to move a plurality of blocks between a lower elevation of a column of the frame and a higher elevation of the column. A vertical distance between the lower elevation and the higher elevation of each of the blocks is the same. Operating the crane includes coupling the crane to one or more of the blocks in a column of the frame and moving said one or more blocks from the lower elevation of the column to the higher elevation of the column to store an amount of electrical energy corresponding to a potential energy amount of said one or more blocks. Operating the crane also includes coupling the crane to one or more of the blocks in the column of the frame and moving said one or more blocks from the higher elevation of the column to the lower elevation of the column under a force of gravity to generate an amount of electricity via an electric motor-generator electrically connected to the crane.

In accordance with another aspect of the disclosure, an elevator cage is provided for use in an energy storage and delivery system to move blocks between a lower elevation of a tower and a higher elevation of a tower to store energy and to move blocks between a higher elevation of the tower and a lower elevation of the tower under force of gravity to generate electricity. The elevator cage comprises a top support, a pair of side supports attached to and extending transverse to the top support, a bottom support attached to and extending transverse to the pair of side supports, the top support, pair of side supports and bottom support defining an opening generally corresponding with a shape of the block. The elevator cage also comprises one or more pairs of track portions attached to the pair of side supports and extending transverse to the side supports. Each of the one or more pair of track portions are configured to align with a pair of beams of a row in the tower to allow transfer of a block from the pair of beams to the pair of track portions.

In accordance with another aspect of the disclosure, an elevator cage is provided for use in an energy storage and delivery system to move blocks between a lower elevation of a tower and a higher elevation of a tower to store energy and to move blocks between the higher elevation of the tower and the lower elevation of the tower under force of gravity to generate electricity. The elevator cage comprises a top support, and a frame that includes a rear support that extends along a plane and one or more side arms attached to the rear support and that extend transverse to the rear support. The elevator cage also comprises one or more actuatable supports movably coupled to the rear support and configured to move between a retracted position where the one or more actuatable supports extend transversely relative to the side arms and an extended position where the one or more actuatable supports extend transversely relative to the plane of the rear support. The one or more actuatable supports in the extended position are configured to support a bottom of a block thereon when the block is adjacent the rear support.

DETAILED DESCRIPTION

Disclosed below is an energy storage and delivery system operable to convert electricity into potential energy, and generate electricity from the potential energy when electricity is in demand. The energy storage and delivery system can be operatively coupled to the electrical grid for stabilizing the electrical grid and delivering electricity for residential, commercial, and/or industrial consumers.

Figure 1:
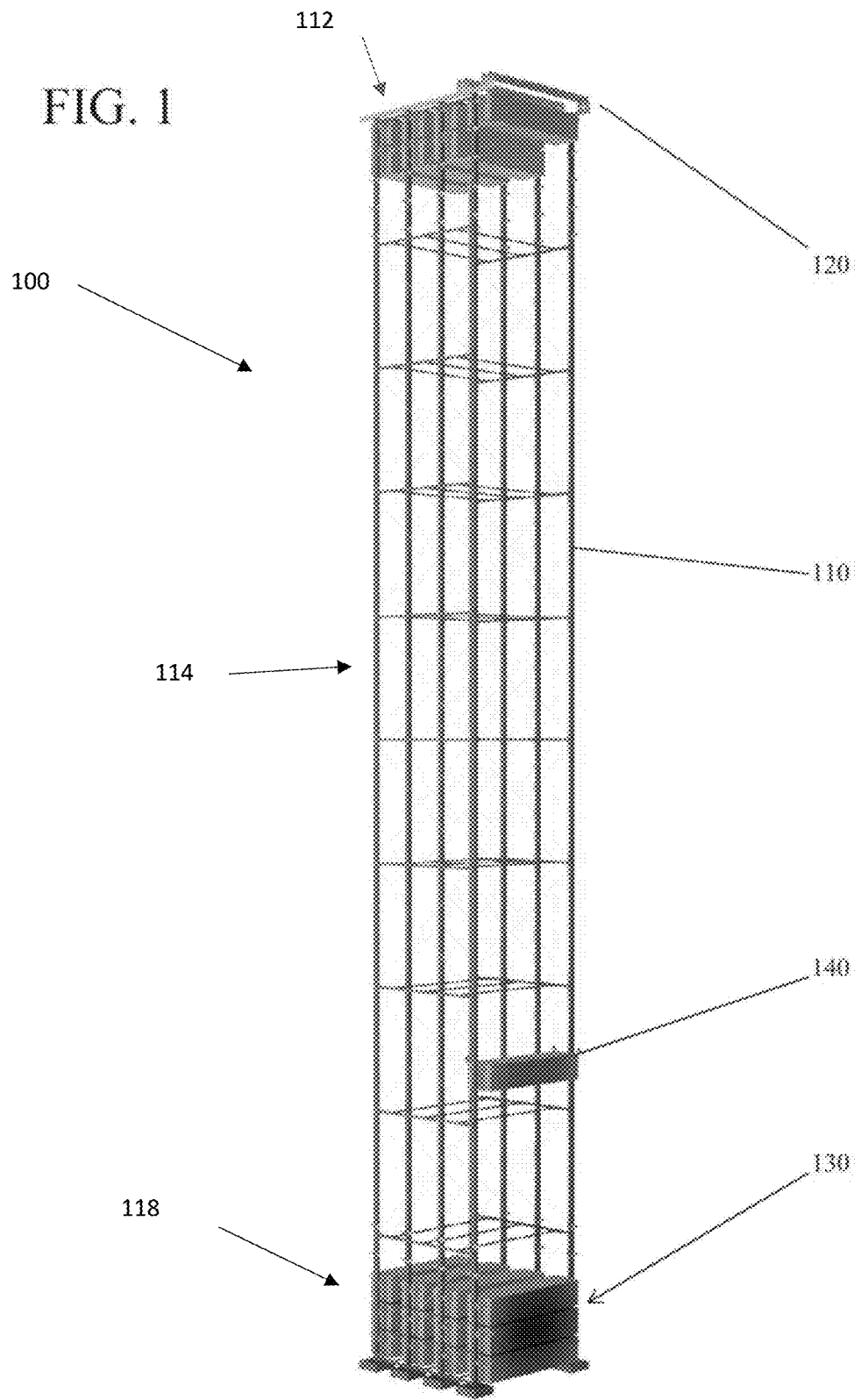
FIG. 1 is a schematic perspective view of an energy storage and delivery system for storing energy and generating electricity on demand.
Figure 2:
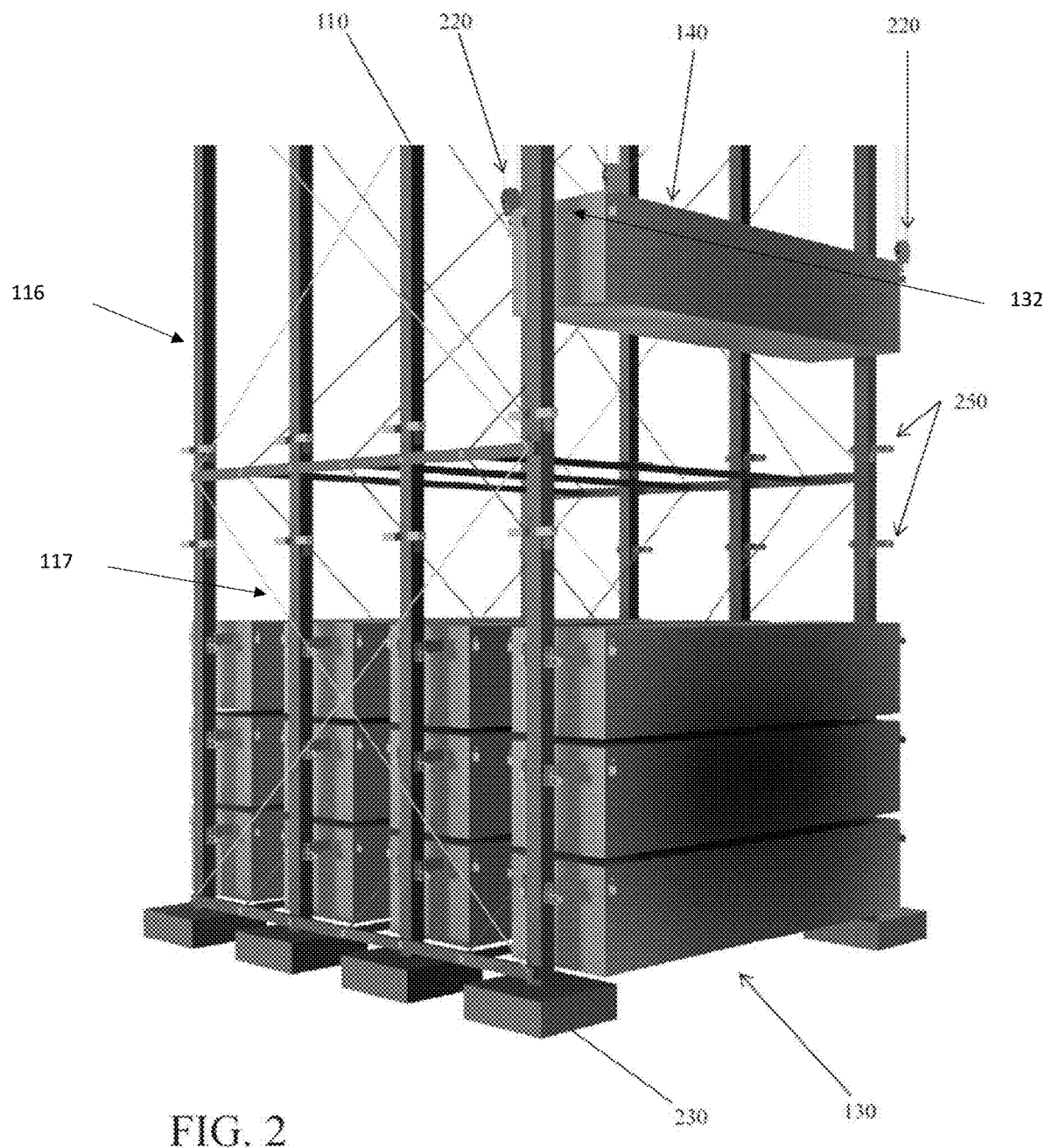
FIG. 2 is a partial schematic view of the system of FIG. 1, showing a bottom portion of the system.
Figure 3:
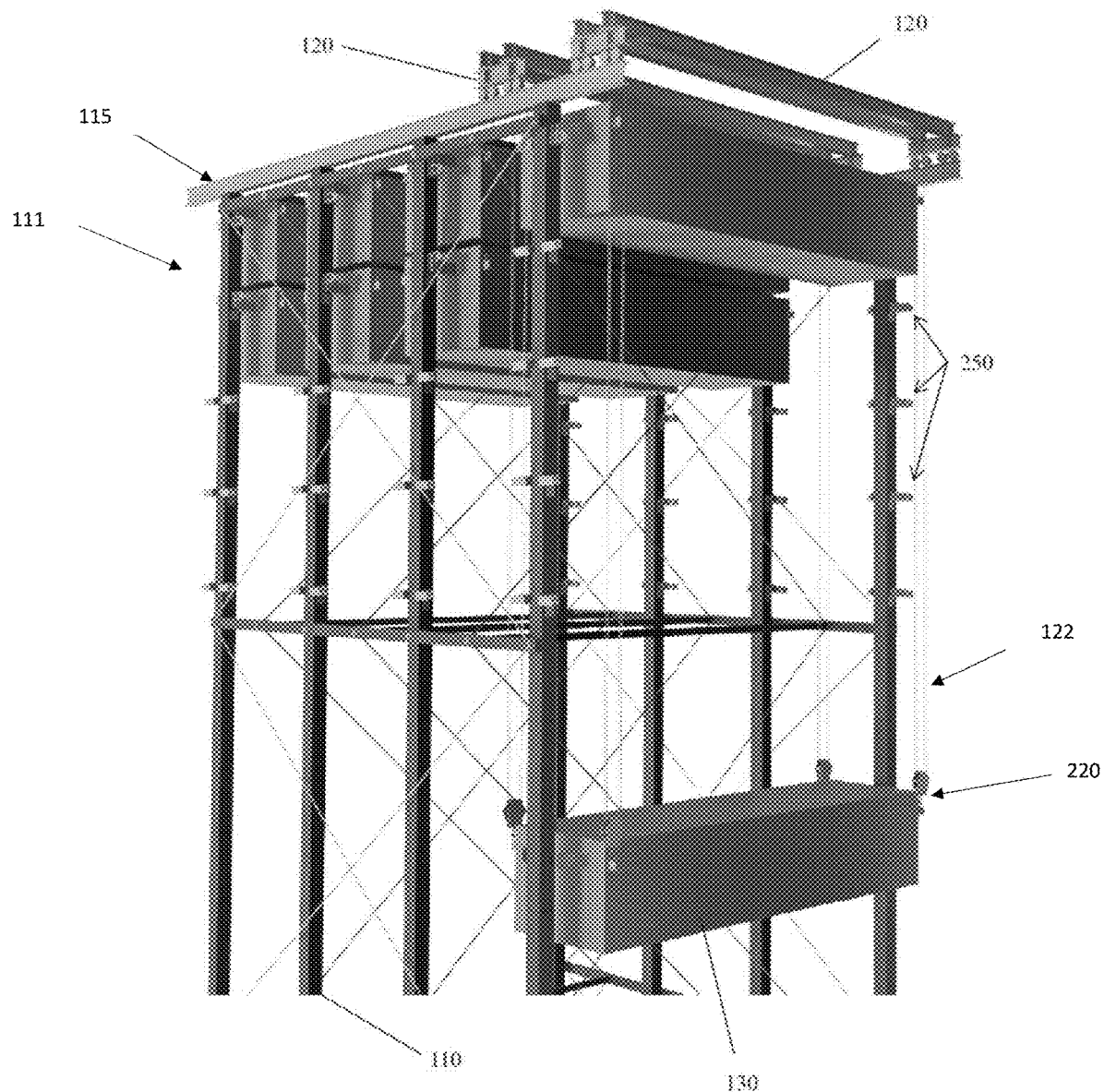
FIG. 3 is a partial schematic view of the system of FIG. 1, showing a top portion of the system.

FIGS. 1-3 show an example energy storage and delivery system 100. The system 100 includes a frame or tower 110 that defines one or more columns 112 (e.g., four columns) and one or more rows 114 (e.g., ten rows). The frame or tower 110 can include a plurality of (e.g., reinforced concrete) pillars 116 and cross-members 117 (e.g., cables) that provide the frame or tower 110 with lateral stability (e.g., provide the pillars 116 with diagonal bracing). The frame or tower 110 can be supported on one or more (e.g., on multiple) footings 230. As shown best in FIGS. 1 and 3, the system 100 can have one or more cranes 120. The one or more cranes 120 can be bridge cranes. The crane(s) 120 are movably coupled to an upper portion 111 of the frame or tower 110 and can move (horizontally) between columns 112 along one or more tracks 115.

The system 100 includes a plurality of ballast weights or blocks 130 (also referred to as bricks in this disclosure), and a motor-generator (140 in FIGS. 4A-4D). In one implementation the blocks 130 can be made from local soil and/or remunerated waste material (e.g., coal combustion residuals such as bottom ash, fiberglass from decommissioned wind turbine blades, waste tailings from mining processes). The block(s) 130 can in one implementation have a greater length than height or width (e.g., generally rectangular lengthwise cross-section and generally square widthwise cross-section). Multiple blocks 130 (e.g., two blocks 130) can travel in each of the columns 112. In one implementation, each block 130 only travels within its associated column 112. As shown in FIG. 1, the vertical travel distance of each block 130 is the same. For example, the topmost block 130 in each column 112 can travel between the highest location in the upper portion 111 of the frame or tower 110 and the highest location in the lower portion 118 of the frame or tower 110 relative to other blocks 130 in the same column 112. Similarly, the bottom-most block 130 in each column 112 can travel between the bottom-most location in the lower portion 118 of the frame or tower 110 to the bottom-most location in the upper portion 111 of the frame or tower 110 relative to other blocks 130 in the same column 112.

The crane(s) 120 can selectively couple to one or more of the blocks 130 (e.g., via cables 122 and hooks, hinges or other grabber mechanism 220). To store electricity or other form of energy, a ballast weight or block 130 is lifted by the crane 120 to a higher elevation (e.g., the top) of the frame or tower 110 where it is locked into position, as further described below. To release energy and generate electricity, the ballast weight or block 130 is lowered from the higher elevation (e.g., the top) of the frame or tower 110 by the crane 120 to a lower elevation (e.g., the bottom) of the frame or tower 110 (e.g., under gravity). As the block 130 is lowered, the force (e.g., gravity) on the block 130 is used to rotate the motor-generator to generate electricity, which can be delivered to the electrical grid the motor-generator is electrically connected to.

In one implementation, the ballast weights or blocks 130 are shipping containers with internal ballast mass and weigh approximately 67,000 pounds. Each crane 120 can include a plurality of cables 122 and grabbers 220 that can securely hold the ballast weight or block 130 while it is lifted or lowered by the crane 120. The cables 122 and grabbers 220 can operate above the ballast weight or block 130 and outside of the perimeter thereof, as viewed in the horizontal plane. In this manner, the grabbers 220 can reach down and couple to (e.g., grab) a ballast weight or block 130 even when multiple ballast weights or blocks 130 are vertically between the crane 120 and ballast weight or block 130 being grabbed or lifted.

In one implementation, each ballast weight or block 130 can be removably coupled to the frame or tower 110 via one or more posts 132 of the block 130 (e.g., metal posts attached to or embedded in the block 130) that engage one or more posts 250 attached to the pillars 116 of the frame or tower 110. The posts 250 can hold (e.g., support) each ballast weight or block 130 (in a fixed vertical position) via three or more points of contact (e.g., the posts 132 of the block 130). In one implementation, the posts 250 are movable (e.g. retractable). For example, the posts 250 may be actuated electrically, hydraulically, or pneumatically between an extended position in which the posts 250 can support at least a portion of the ballast weight or block 130 thereon (in a fixed vertical position) and a retracted position (e.g., extending linearly in a direction generally parallel to the pillars 116 that define the columns 112) in which the posts 250 do not engage the ballast weight or block 130, thereby allowing the ballast weight or block 130 to move past the location of the posts 250 without engaging the posts 250. In another implementation, the posts 250 are permanently fixed to the frame or tower 110 (e.g., to pillars 116 of the frame or tower 110), for example in an orientation generally transverse to the pillars 116. The ballast weight or block 110 can be moved up or down by the crane 120 to engage the posts 250 when the crane 120 has the ballast weight or block 130 aligned with the posts 250. To move the ballast weight or block 130 past the posts 250, the crane 120 can lift the block 130, displace it laterally (e.g., horizontally) along a row 114 so that the block 130 is clear of the posts 250, and lift or lower the block 130 to a desired vertical location on the frame or tower 110. Once at the desired vertical location on the frame or tower 110, the crane 120 can displace the block 130 laterally (e.g., horizontally) in the opposite direction so that it is aligned with the posts 250 and lower the block 130 to engage the posts 250 at said desired vertical location. In the system 100 in FIGS. 1-3, the ballast weights or blocks 130 are not in contact with each other and are not stacked atop one another.

Figure 4:
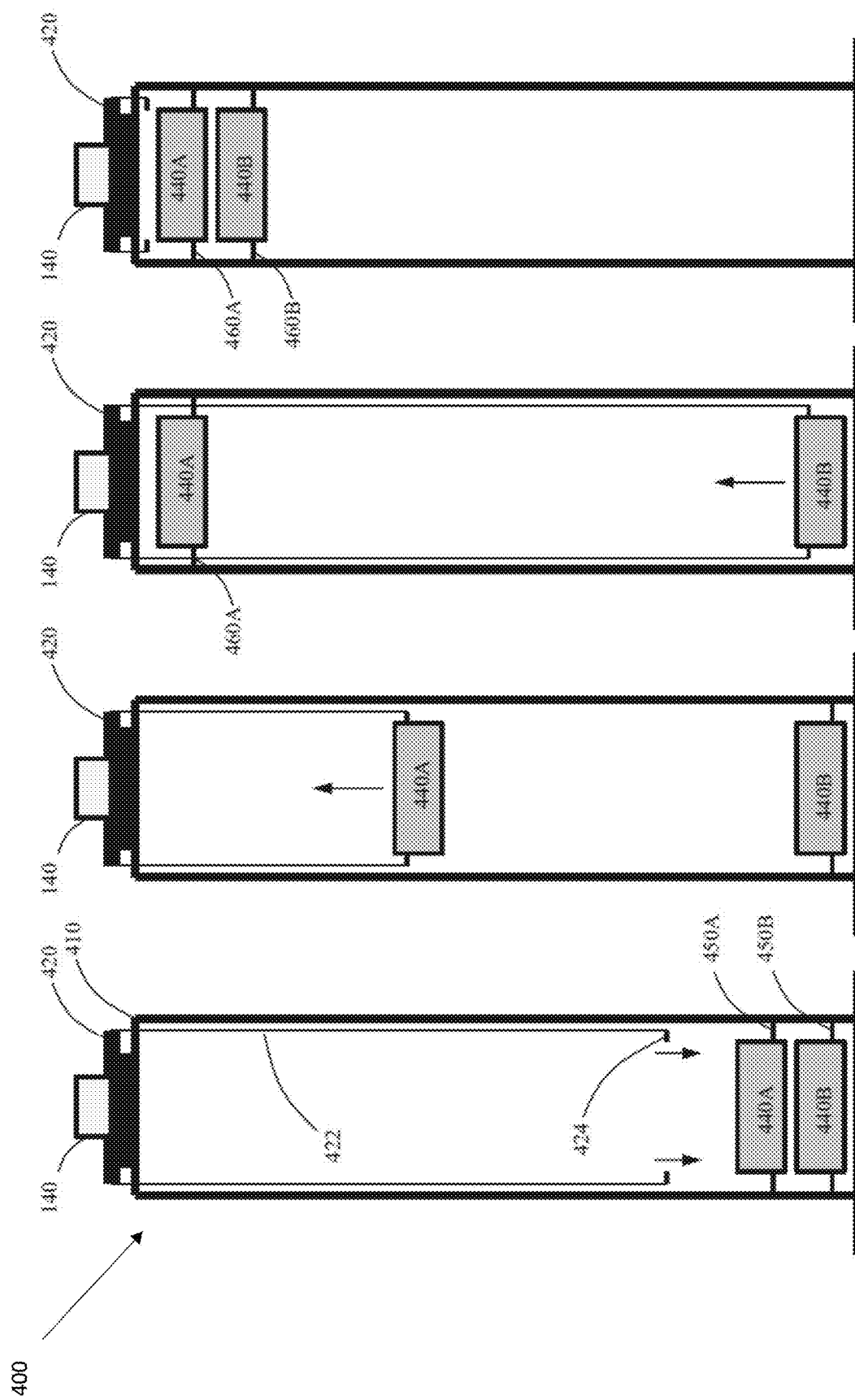
FIGS. 4A-4D are schematic views of the system of FIG. 1, illustrating a sequence of movements of blocks to store energy.

FIGS. 4A-4B illustrates a sequence of diagrammatic illustrations showing the lifting of ballast weights or blocks 440A, 440B with a crane 420 within a frame or tower 410 of an energy storage system 400. The energy storage system 400 can be similar to the energy storage system 100. Thus, reference numerals used to designate the various components of the system 400 are identical to those used for identifying the corresponding components of the system 100 in FIGS. 1-3, except that a "4" has been added to the front of the numerical identifier. Therefore, the structure and description for the various features of the system 100 in FIGS. 1-3 are understood to also apply to the corresponding features of the system 400 in FIGS. 4A-4D, except as described below.

To store electricity or other form of energy, the crane 420 (e.g., bridge crane) rolls to a position above the ballast weight or block 440A (e.g., a shipping container) to be lifted. The cables 422 are lowered until the grabbers 424 are able to securely attach to the ballast weight or block 440A (e.g., a shipping container). As illustrated in FIG. 4B, in one implementation the posts 450A are retracted and the shipping container 440A is lifted to a new position at the top of the frame or tower 410 using the motor-generator 140. Once in position, retractable posts 460A are extended (e.g., from the frame or tower 410) to hold the ballast weight or block 440A (e.g., shipping container). For example, in the raised position, the ballast weight or block 440A can be approximately 100 meters above its initial position. To store additional electricity or other form of energy, the crane 420 can lower the cables 422 until the grabbers 424 are able to securely attach to the ballast weight or block 440B (e.g., shipping container), as illustrated in FIG. 4C. As illustrated in FIG. 4B, the posts 450A are retracted and the shipping container 440B is lifted to a new position (e.g., near the top) of the frame or tower 410 using the motor-generator 140. Once in position, retractable posts 460B are extended (e.g., from the frame or tower 410) to hold the ballast weight or block 440B (e.g., shipping container). For example, in the raised position, the ballast weight or block 440B can be approximately 100 meters above its initial position. The ballast weights or blocks 440A, 440B do not contact each other and do not stack atop each other. In another implementation, the posts 450A, 450B, 460A, 460B are fixed to the tower 410 (e.g., not retractable), and the crane 420 laterally displaces (e.g., into or out of the page in FIGS. 4A-4B) the block 440A, 440B, as discussed above, to clear the posts 450A, 450B, 460A, 460B during vertical movement of the block 440A, 440B, and once at the desired vertical location laterally displaces (in the opposite direction) the blocks 440A, 440B to couple the blocks 440A, 440B with the posts 450A, 450B, 460A, 460B.

In another implementation, the two or more blocks 440A, 440B in a column are lifted at the same time. For example, the grabbers 424 can be spaced as distances corresponding to the distances between the blocks 440A, 440B to allow coupling of the grabbers 424 with multiple blocks 440A, 440B at the same time to thereafter lift multiple blocks 440A, 440B simultaneously. One of skill in the art will recognize that the description above with respect to FIGS. 4A-4B for movement of the blocks 440A, 440B is understood to apply to the movement of blocks 130 in the system of FIGS. 1-3.

With reference to FIG. 1, in one implementation of an energy storage process all the blocks 130 in a first column are lifted first, followed by the all the blocks 130 in the next column 112 and so on. An energy delivery process optionally follows the same sequence in reverse. In another implementation of an energy storage process, a block 130 in a first column 112 is raised, followed by a block 130 in a second column 112, and so on, until a block 130 in all columns 112 has been raised. Then the next block 130 in the first column 112 is raised, followed by the next block 130 in the second column 112 and so on. An energy delivery process optionally follows the same sequence in reverse.

To release energy and generate electricity, the crane 420 can lower the ballast weights or blocks 130, such as the blocks 440A, 440B, (e.g., one at a time, multiple blocks simultaneously) in a column 112 from the higher elevation (e.g., top) of the frame or tower 410 to a lower elevation (e.g., the initial position of the blocks 440A, 440B at the bottom) of the frame or tower 410. The motor-generator 140 generates electricity as the blocks 440A, 440B are lowered (e.g., by converting the change in potential energy to electricity via the rotation of the motor-generator 140). The sequence of lowering the ballast weights or blocks 440A, 440B is optionally the reverse of the sequence used to raise the ballast weights or blocks 440A, 440B.

Figure 5:
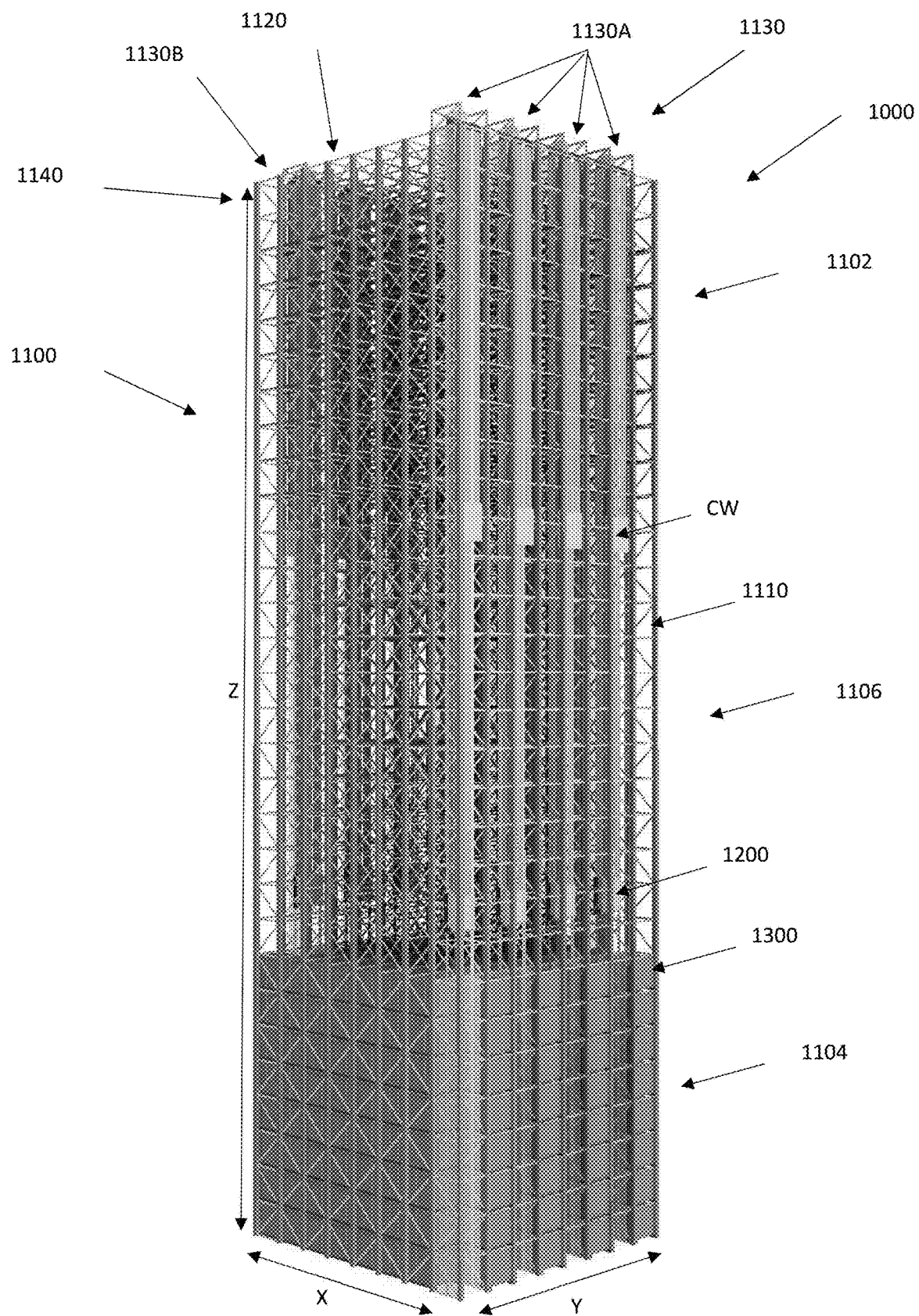
FIG. 5 is a schematic perspective view of an energy storage and delivery system for storing energy and generating electricity on demand.
Figure 6:
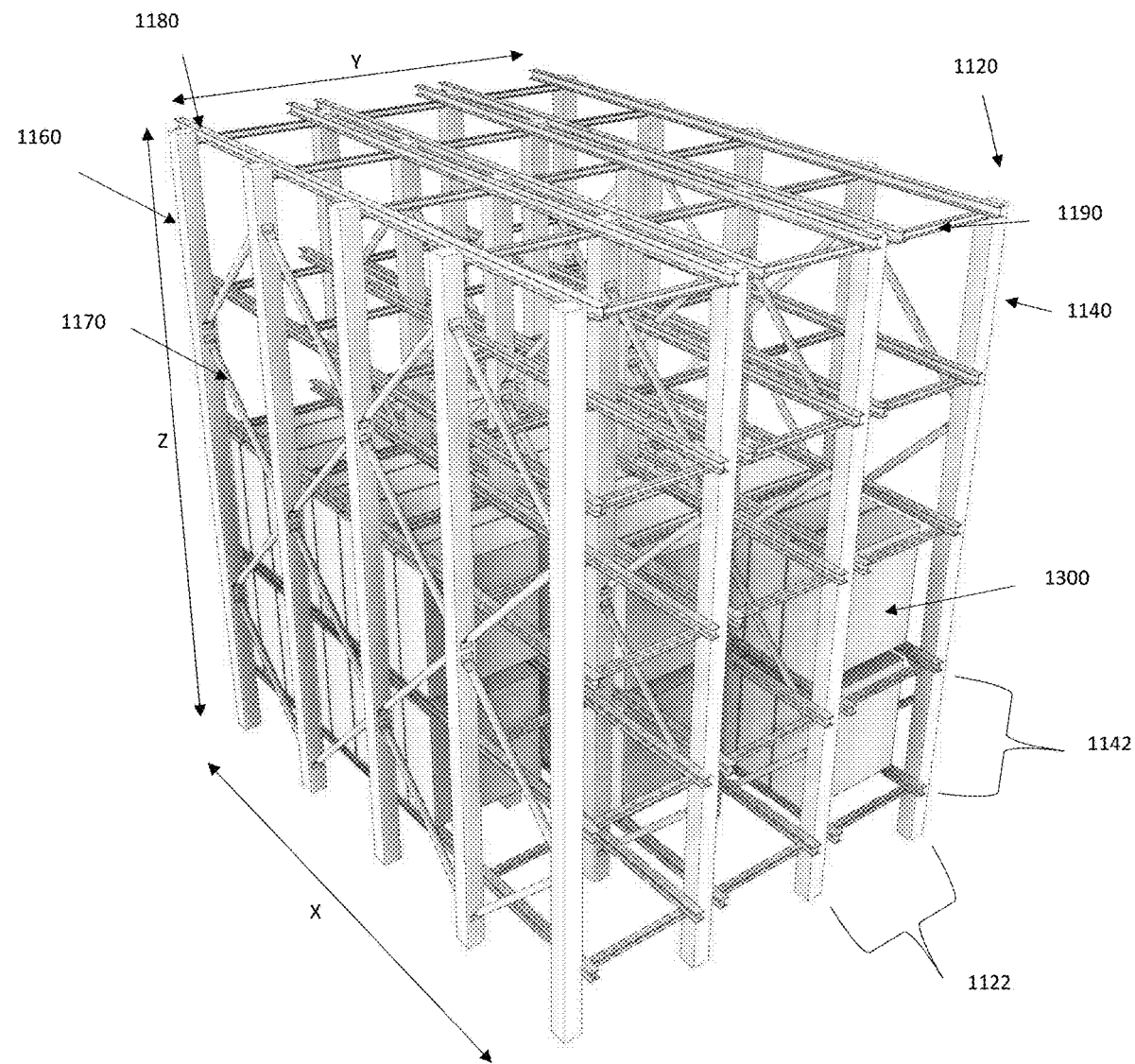
FIG. 6 is a schematic view of a portion of the system of FIG. 5.

FIGS. 5-6 illustrate an example energy storage and delivery system 1000 (the "system") operable to convert electrical energy or electricity into potential energy for storage, and to convert potential energy into electrical energy or electricity, for example, for delivery to an electrical grid.

The system 1000 includes a frame or tower 1100 (also referred to as a module in this disclosure) having one or more columns 1120 that extend in a height direction Z of the tower 1100, one or more rows or floors 1140 that extend in a width direction X of the frame or tower 1100 and one or more structures 1110 (e.g., slices of the module 1100) defined by a set of rows 1140 and columns 1120 in a depth direction Y of the frame or tower 1100. Each structure 1110 (e.g., slice of the module 1100) can be operated independently depending on demand for energy from the system 1000. The frame 1100 has an upper section 1102, a lower section 1104 and an intermediate section 1106. In one implementation, ballast weights or blocks 1300 are moved between the upper section 1102 and the lower section 1104, as further described below, allowing the intermediate section 1106 to be used for other purposes.

In one implementation, the intermediate section 1106 can be used for vertical farming. For example, the intermediate section 1106 can operate as a greenhouse, providing illuminated hydroponic farming, where such illumination can be powered by electricity generated by the energy storage and delivery system 1000 (e.g., by lowering blocks 1300). In another implementation, the intermediate section 1106 can be used for the storage of water. In another implementation, the intermediate section 1106 can be used as a warehouse to store material (e.g., storage of material, unattended by humans). In still another implementation, the intermediate section 1106 can be used as a data center (e.g., storing computer servers), where the data center can be powered by electricity generated by the energy storage and delivery system 1000 (e.g., by lowering blocks 1300). Therefore, the intermediate section 1106 can be productively used and does not remain empty during operation of the system 1000, providing additional value to the system 1000.

The upper section 1102 and lower section 1104 can have the same size (e.g., same number of rows 1140 and columns 1120). In some implementations, the number of rows 1140 in the upper section 1102 and lower section 1104 are each an even number (e.g., 8, 10, 12 rows). In other implementations, the number of rows 1140 in the upper section 1102 and lower section 1104 are each an odd number (e.g., 9, 11, 13 rows).

In one implementation, the upper section 1102 and lower section 1104 each take up ¼ of the height or area of the frame or tower 1100, with the intermediate section 1106 making up the remaining ½ of the height or area of the frame or tower 1100. In another implementation, the upper section 1102 and lower section 1104 each take up ⅓ of the height or area of the frame or tower 1100, with the intermediate section 1106 making up the remaining ⅓ of the height or area of the frame or tower 1100.

The frame 1100 includes a plurality of elevator shafts 1130. For example, the frame 1100 can have elevator shaft(s) 1130A on one end of the rows 1140 and elevator shaft(s) 1130B on an opposite end of the rows 1140 (for each structure 1110), via which the blocks 1300 are moved between one or more rows 1140 in the upper section 1102 and one or more rows in the lower section 1104 of the frame 1100, as further described below. In one implementation, an equal number of elevator shafts 1130A are on one end of the rows 1140 of the frame or tower 1100 as the number of elevator shafts 1130B on the opposite end of the rows 1140. The frame or tower 1100 can in one implementation have a height of a 30 story building (e.g., approximately 90 meters tall). However, the frame or tower 1100 can have a smaller or greater height than 30 stories (e.g., 120 meters tall). With continued reference to FIG. 5 the blocks 1300 are moved horizontally along the rows 1140 (via a trolley in each row 1140, described further below) to the elevator shafts 1130A, 1130B at the ends of the rows 1140 and then moved vertically along the elevator shafts 1130A, 1130B via an elevator cage 1200 (described in more detail below) in each elevator shaft 1130A, 1130B. The elevator cages 1200 move (e.g., under force of gravity) to a lower elevation to generate electricity, and are raised by motor-generators (1500 in FIG. 9) at the top of the tower or frame 1100. Counterweights CW facilitate the movement of the elevator cage 1200. The movement of the elevator cages 1200 in opposite elevator shafts 1130A, 1130B are synchronized to maximize efficiency of the system 1000.

The longer the rows 1140 are between the elevator shafts 1130A, 1130B, the more blocks 1300 (e.g., mass) the row 1140 can hold and the greater the energy (e.g., hours of energy) the system 1000 can deliver. The greater the depth (in the Y direction) of the elevator shafts 1130A, 1130B (e.g. the greater the number of structures 1110 or slices of the module 1100 in the Y direction), the greater the amount of power the system 1000 can generate. In one implementation, operation of the elevator cage 1200 in each elevator shaft 1130A, 1130B can provide between about 500 kW and about 1000 kW (e.g., about 800 kW) of power, so that the two elevator shafts 1130A, 1130B in one structure 1110 or slice of the module 1100 can generate approximately 1.6 MW. In a system that has eight structures 1110 (e.g., slices of the module 1100) in the Y direction, each structure 1110 having two elevator shafts 1130, 1130B, the system can generate approximately 12.8 MW of power. Assuming the length of the rows 1140 allows for four hours of energy, the total output of the system is approximately 12.8 MW×4 hr. or 51.2 MW-hrs.

As best shown in FIG. 6, the frame 1100 can be made of a plurality of pillars 1160 (e.g., of reinforced concrete, pre-casted columns of concrete) that define the one or more columns 1120, cross-members 1170 (e.g., diagonal bracing members, made of metal) that interconnect the columns 1120 to provide stability to the frame 1100 (e.g., in a width-wise direction X of the frame 1100), and a plurality of beams (e.g., I-beams) 1180 that define the one or more rows 1140 and are supported on cross-beams 1190 that extends in a depth direction Y of the frame 1100 between the columns 1120. The beams 1180 and cross-beams 1190 can be made of metal (e.g., steel). The columns 1120 can be spaced from each other in the depth direction Y of the frame 1100 by a distance 1122, and the rows 1140 can be spaced from each other in the height direction Z of the frame 1100 by a distance 1142. The distances 1122, 1142 are sized to allow the one or more blocks 1300 to fit in each row (one behind another) so that the blocks 1300 are supported on the beams 1180 as further discussed below. In one implementation, the distances 1122, 1142 are the same, allowing the blocks 1300 to have a substantially square end face (see FIG. 12), for example to simplify the manufacturing of the blocks 1300. In one implementation, the blocks 1300 can be made from local soil and/or remunerated waste material (e.g., coal combustion residuals such as bottom ash, fiberglass from decommissioned wind turbine blades, waste tailings from mining processes) or other recycled material.

Figure 7:
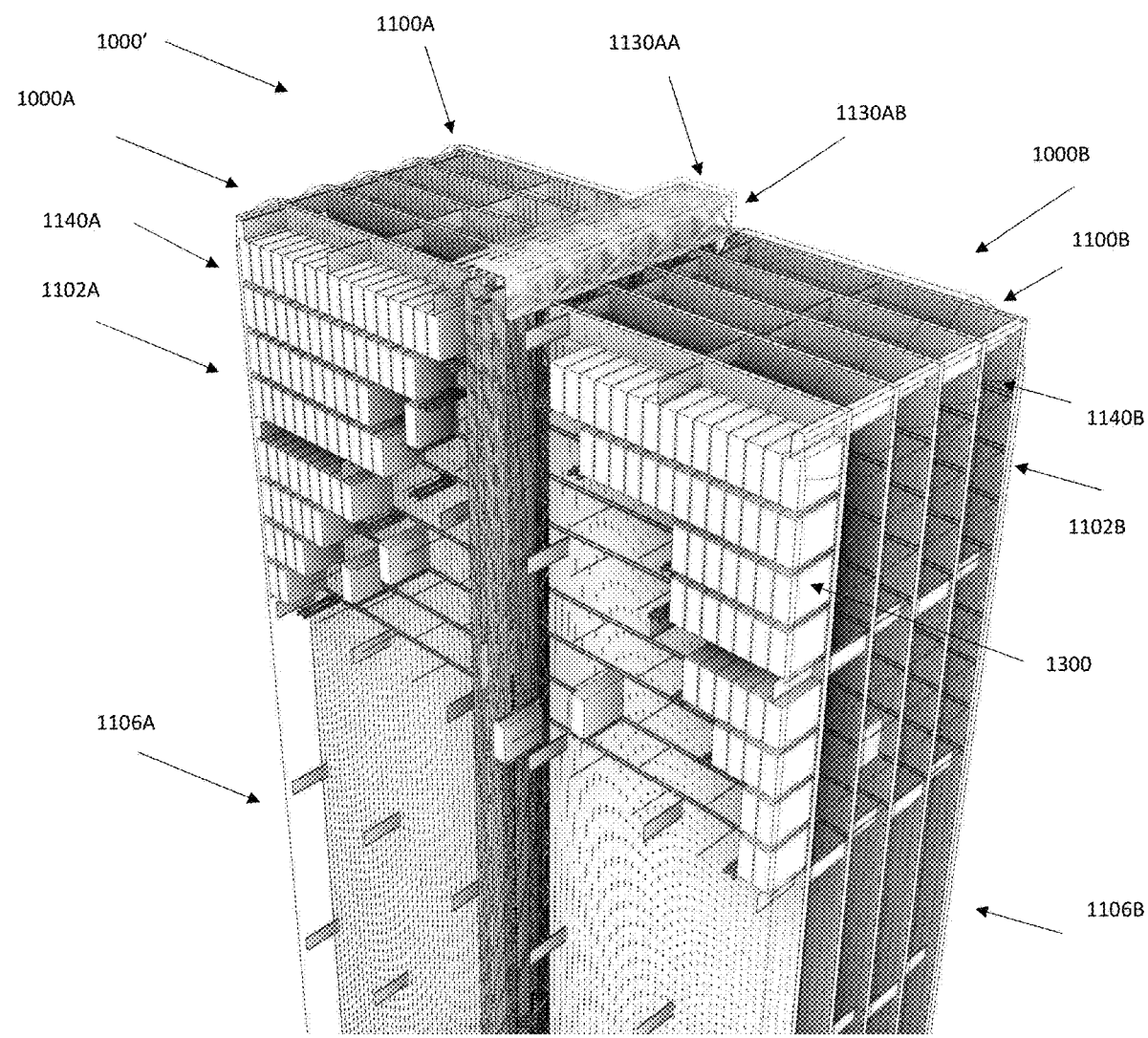
FIG. 7 is a partial schematic view of an energy storage and delivery system, showing arrangement of blocks in an upper portion of the tower of two adjacent modules similar to the system in FIG. 5.

FIG. 7 shows a partial perspective view of a portion of an energy storage and delivery system 1000' having two modules 1000A, 1000B arranged adjacent each other. The modules 1000A, 1000B are each similar to the module 1100 of the energy storage and delivery system 1000 shown in FIGS.

5-6. Thus, reference numerals used to designate the various components of the modules 1000A, 1000B are identical to those used for identifying the corresponding components of the module 1100 in FIGS. 5-6, except that an "A" or "B" has been added to the end of the numerical identifier. Therefore, the structure and description for the various features of the module 1100 in FIGS. 5-6 are understood to also apply to the corresponding features of the modules 1000A, 1000B of the system 1000' in FIG. 7, except as described below.

The elevator shafts 1130AA, 1130AB of the modules 100A, 100B can be adjacent each other and the rows 1140A, 1140B oriented in generally the same direction (e.g., aligned) for both modules 1000A, 1000B (e.g., in the upper sections 1102A, 1102B). As shown in FIG. 7, no blocks 1300 are stored in the intermediate sections 1106A, 1106B of the frame 1100A, 1100B of the modules 1000A, 1000B of the system 1000'. As discussed above, the intermediate sections 1106A, 1106B can be used for other purposes. Optionally, the intermediate section 1106A of the module 1100A is used for a different purpose than the intermediate section 1106B of the module 1100B.

Figure 8:
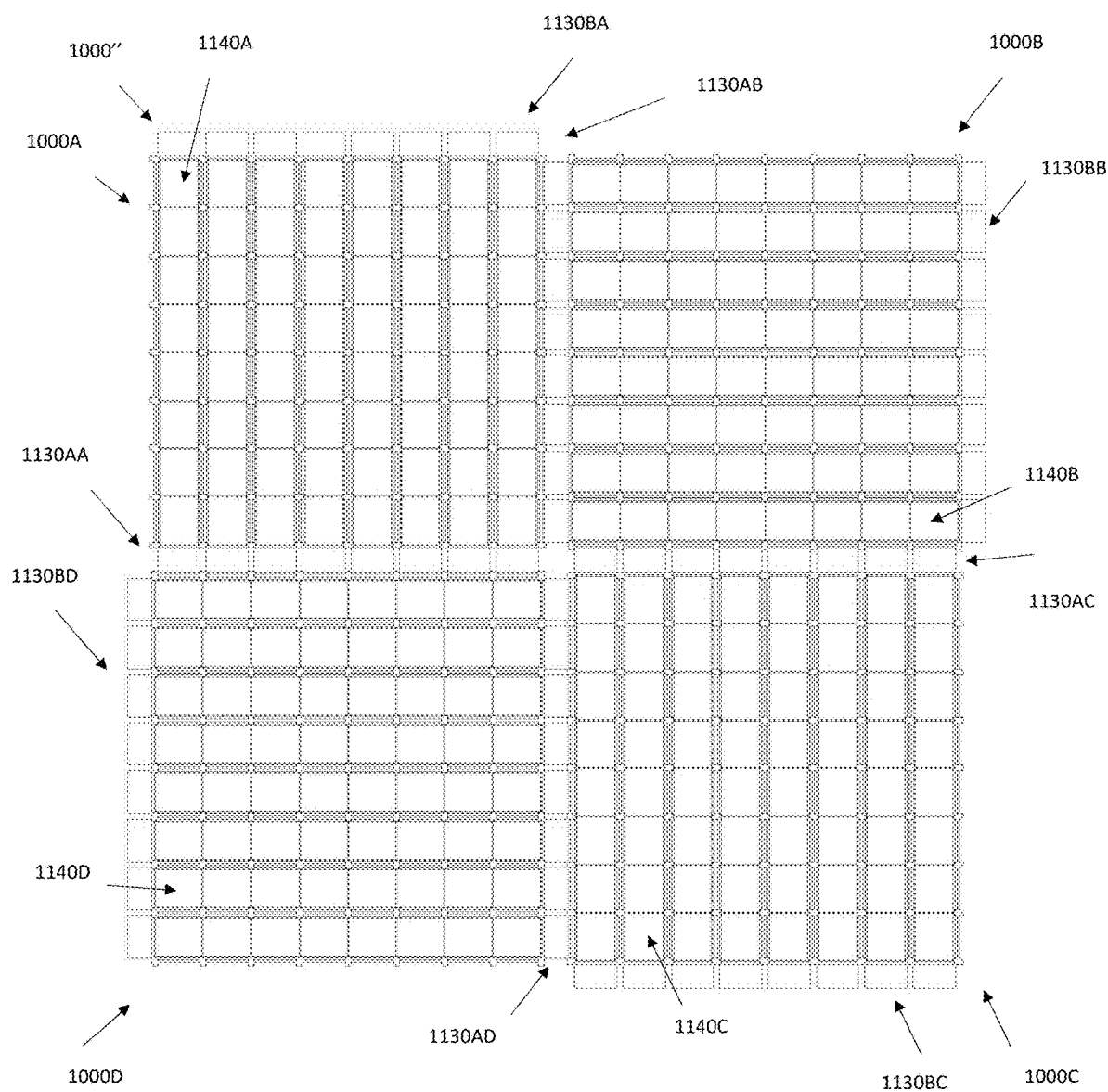
FIG. 8 is a schematic top view of four modules of an energy storage and delivery system, each module similar to the system in FIG. 5, the modules arranged adjacent each other.

FIG. 8 shows a top or plan view of an energy storage and delivery system 1000" including four modules 1000A, 1000B, 1000C, 1000D arranged adjacent each other. The modules 1000A, 1000B, 1000C, 1000D are each similar to the module 1100 shown in FIGS. 5-6. Thus, reference numerals used to designate the various components of the modules 1000A, 1000B, 1000C, 1000D are identical to those used for identifying the corresponding components of the module 1100 in FIGS. 5-6, except that an "A", "B", "C" or "D" has been added to the end of the numerical identifier. Therefore, the structure and description for the various features of the system or module 1100 in FIGS. 5-6 are understood to also apply to the corresponding features of the modules 1000A, 1000B, 1000C and 1000D of the system 1000" in FIG. 8, except as described below.

As with the module 1100, each of the modules 1000A-1000D has two sets of elevator shafts on opposite ends of the rows of the system. For example, module 1000A has elevator shafts 1130AA and 1130BA on opposite ends of the rows 1140A, module 1000B has elevator shafts 1130AB and 1130BB on opposite ends of the rows 1140B, module 1000C has elevator shafts 1130AC and 1130BC on opposite ends of the rows 1140C, and module 1000D has elevator shafts 1130AD and 1130BD on opposite ends of the rows 1140D.

As shown in FIG. 8, each of the modules 1000A, 1000B, 1000C, 1000D is oriented so that each of their sets of rows 1140A, 1140B, 1140C, 1140D extend orthogonal (e.g., perpendicular) to the rows in adjacent modules 1000A-1000D. For example, the rows 1140A of module 1000A extend orthogonally to the rows 1140B of module 1000B and to the rows 1140D of module 1000D. This orthogonal arrangement between the modules 1000A-1000D increases the stability of each of the modules 1000A-1000D, advantageously providing automatic bracing to the modules 1000A-1000D in any direction (e.g., bracing against wind and/or seismic forces). As discussed above, cross-members 1170 (e.g., diagonal bracing) interconnect the columns 1120 to provide stability to the module 1100 (e.g., in a width-wise direction X of the frame 1100) along the direction of the rows 1140. However, there are no cross-members in a transverse direction of the frame or module 1100. Therefore, orienting the modules 1000A-1000D orthogonal to each other advantageously allows the cross-members 1170 in one frame 1100 to provide structural stability or bracing to an adjacent module 1000A-1000D in the direction where it does not have any cross-members 1170. Each of the modules 1000A-1000D can be operated independently of each other. For example, during operation, one or more (e.g., one, two, three, or four) of the modules 1000A-1000D can be operated to store and generate electricity (e.g., depending on demand), or only some of the modules 1000A-1000D can be operated while maintenance is performed on the remaining modules 1000A-1000D.

Though FIG. 8 shows four modules 1000A-1000D, one of skill in the art will recognize that the system 1000" can have any number of modules (e.g., two, three, five, six, seven, eight, ten, twelve) that can optionally arranged in the manner described above. Accordingly, the energy storage and delivery system is scalable and can provide for energy storage and delivery on the order of multiple gigawatt hours (GWh). The modules 1000A-1000D can operate near a clean energy power generating station (e.g., solar energy farm, wind farm) and operated to store at least a portion of the clean energy power generating station (e.g., for delivery to the electrical grid off hours, such as at night).

FIGS. 9-12 show features of the system 1000 for moving blocks 1300 along a row 1140 and all of the description above for the features of the system 1000 apply to the features illustrated in FIGS. 9-12. One of skill in the art will recognize that the same features in FIGS. 9-12 and described below can be implemented in the systems 1000', 1000" in FIGS. 7-8, so that the description below also applies to the systems 1000', 1000" in FIGS. 7-8.

Figure 9:
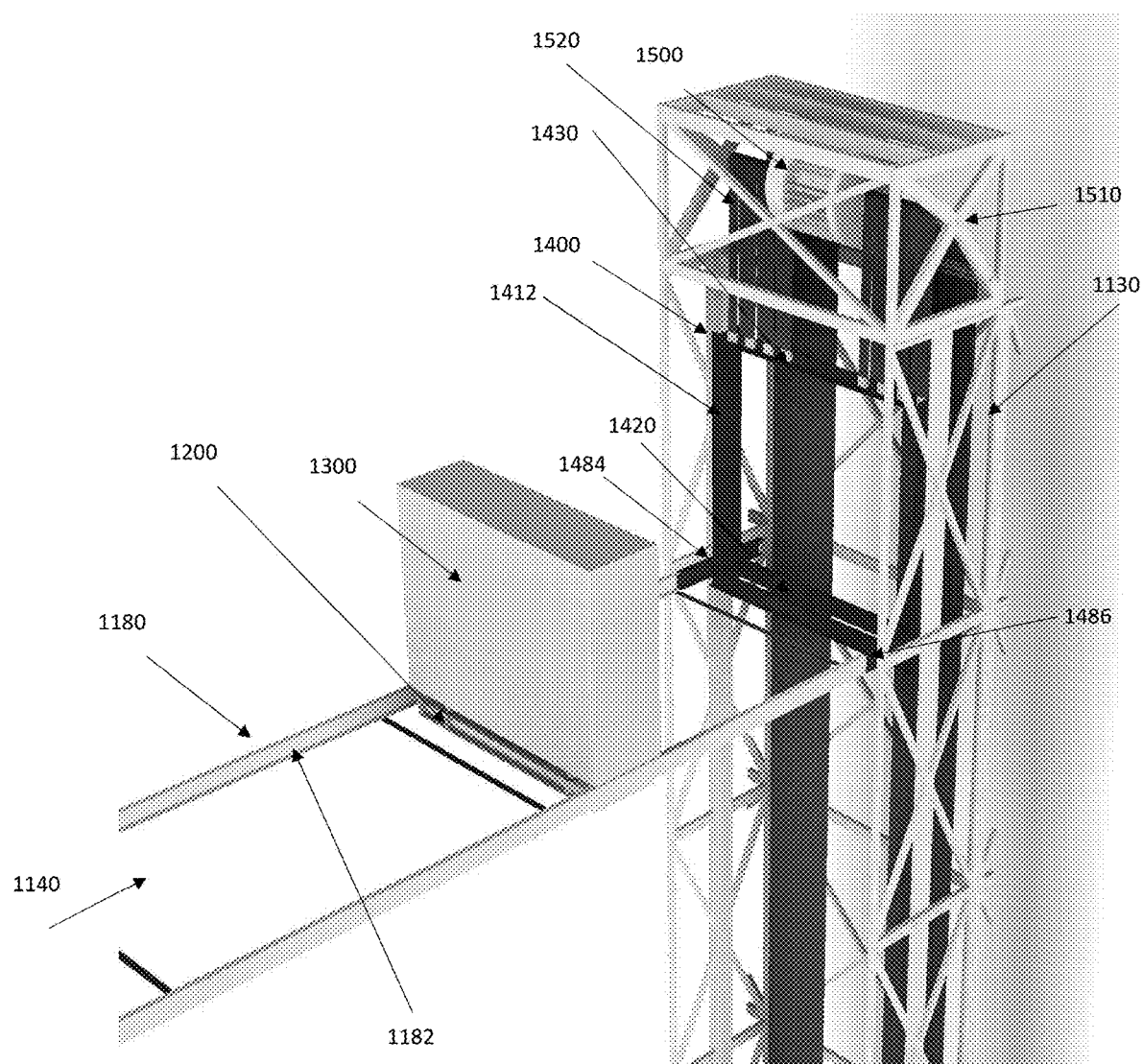
FIG. 9 is a partial schematic view of a row and elevator assembly of the system in FIG. 5, illustrating movement of a block toward the elevator assembly.
Figure 10:
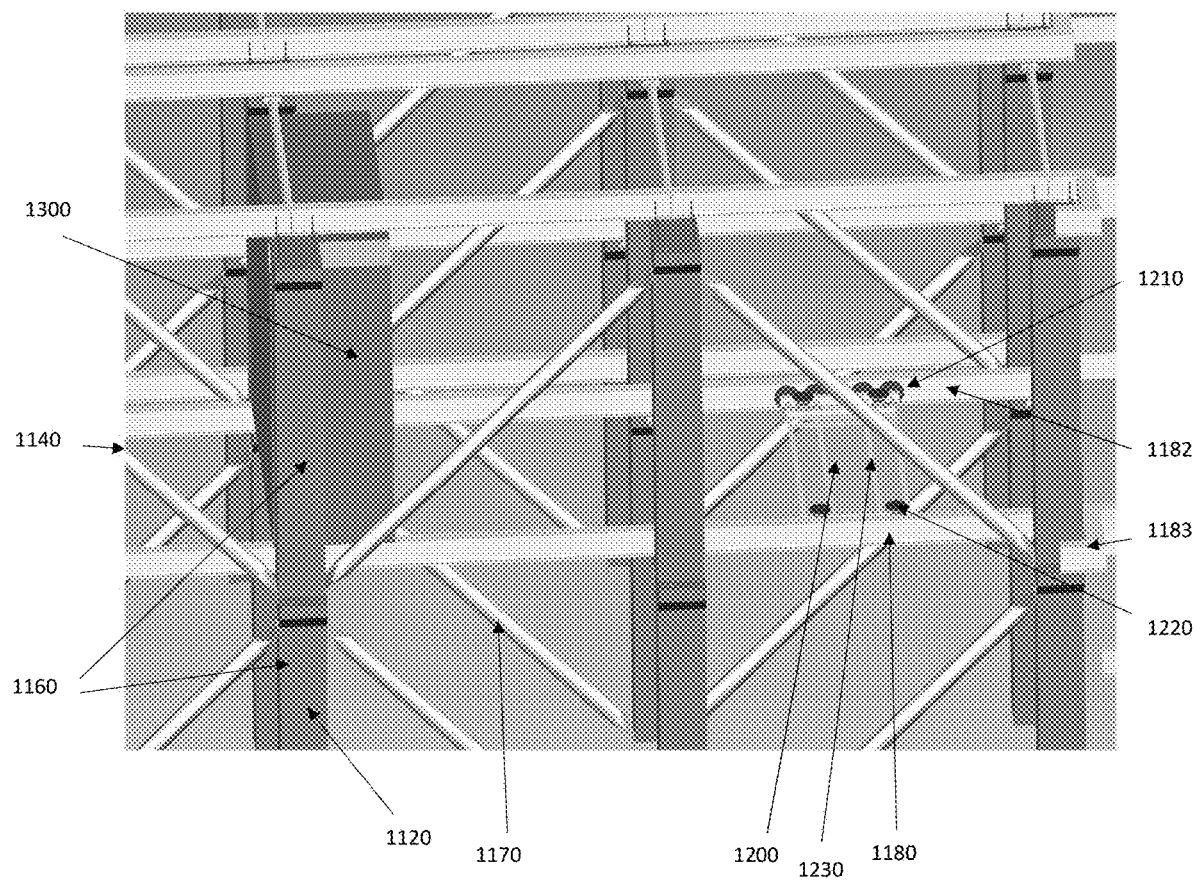
FIG. 10 is a schematic perspective view of a portion of the system in FIG. 5, showing a trolley movably coupled to beams of a row of the system and illustrating a block supported on the beams of said row.
Figure 11:
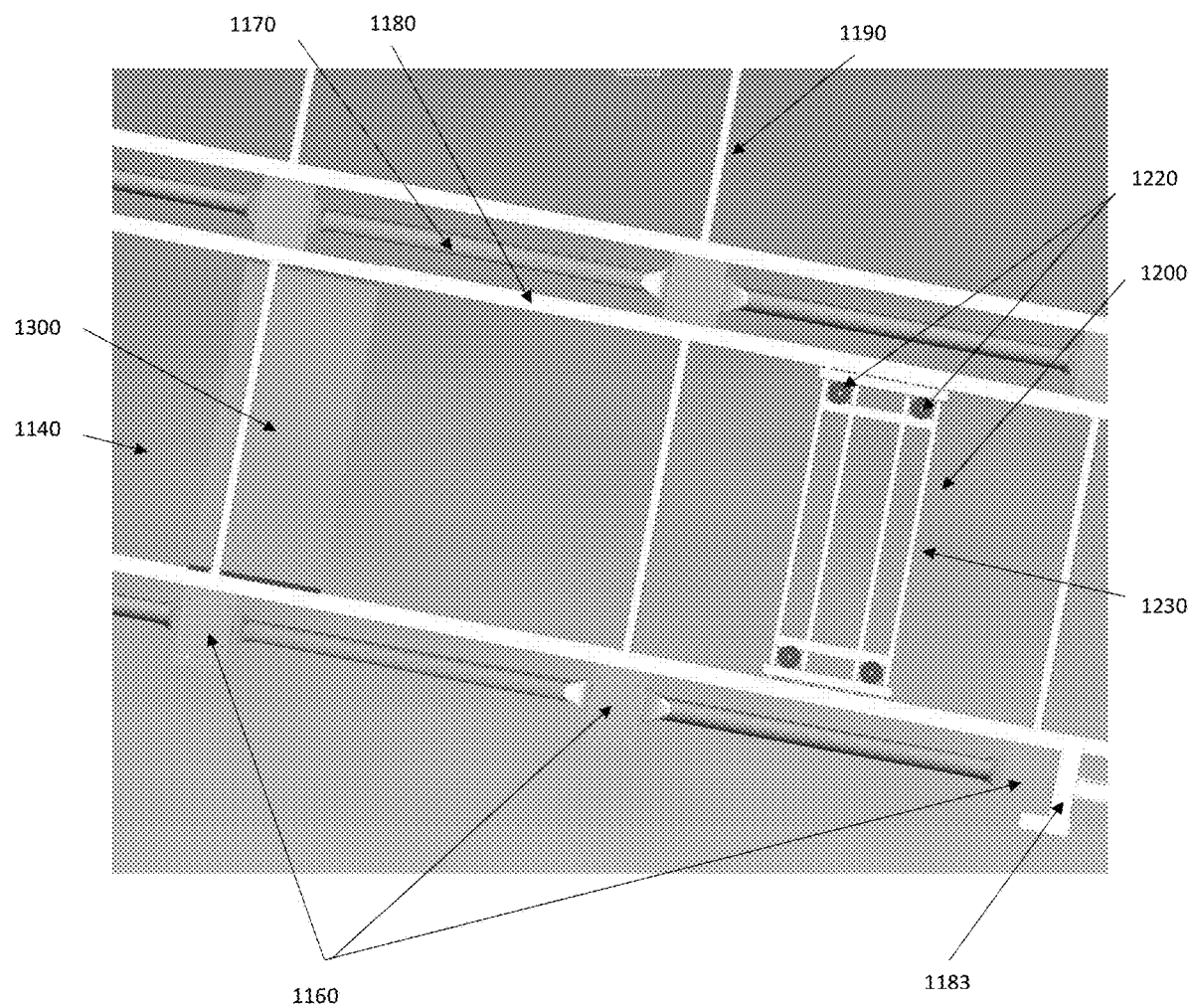
FIG. 11 is a schematic top view of the system in FIG. 10, showing the trolley movably coupled to beams of a row of the system and illustrating the block supported on the beams of said row.

With reference to FIG. 9, the block 1300 can be supported (e.g., in a stationary position) on a pair of beams 1180 in a row 1140 of the frame or tower 1100. The beams 1180 can have a I-beam or C-shaped cross-section that defines a channel 1182 (best shown in FIG. 12) between a top (e.g., a top flange) of the beams 1180 on which the block 1300 is supported and a bottom (e.g., a bottom flange) of the beam 1180. The beams 1180 extend toward an elevator shaft 1130 to allow transfer of the block 1300 to an elevator cage 1400 in the elevator shaft 1130, and the elevator cage 1400 can be operated to move the block 1300 to a different vertical location, as further described below. A motor-generator 1500 can be mounted in or on at least a portion of the elevator shaft 1130 (e.g., at a vertical location above the topmost position of the elevator cage 1400).

Figure 12:
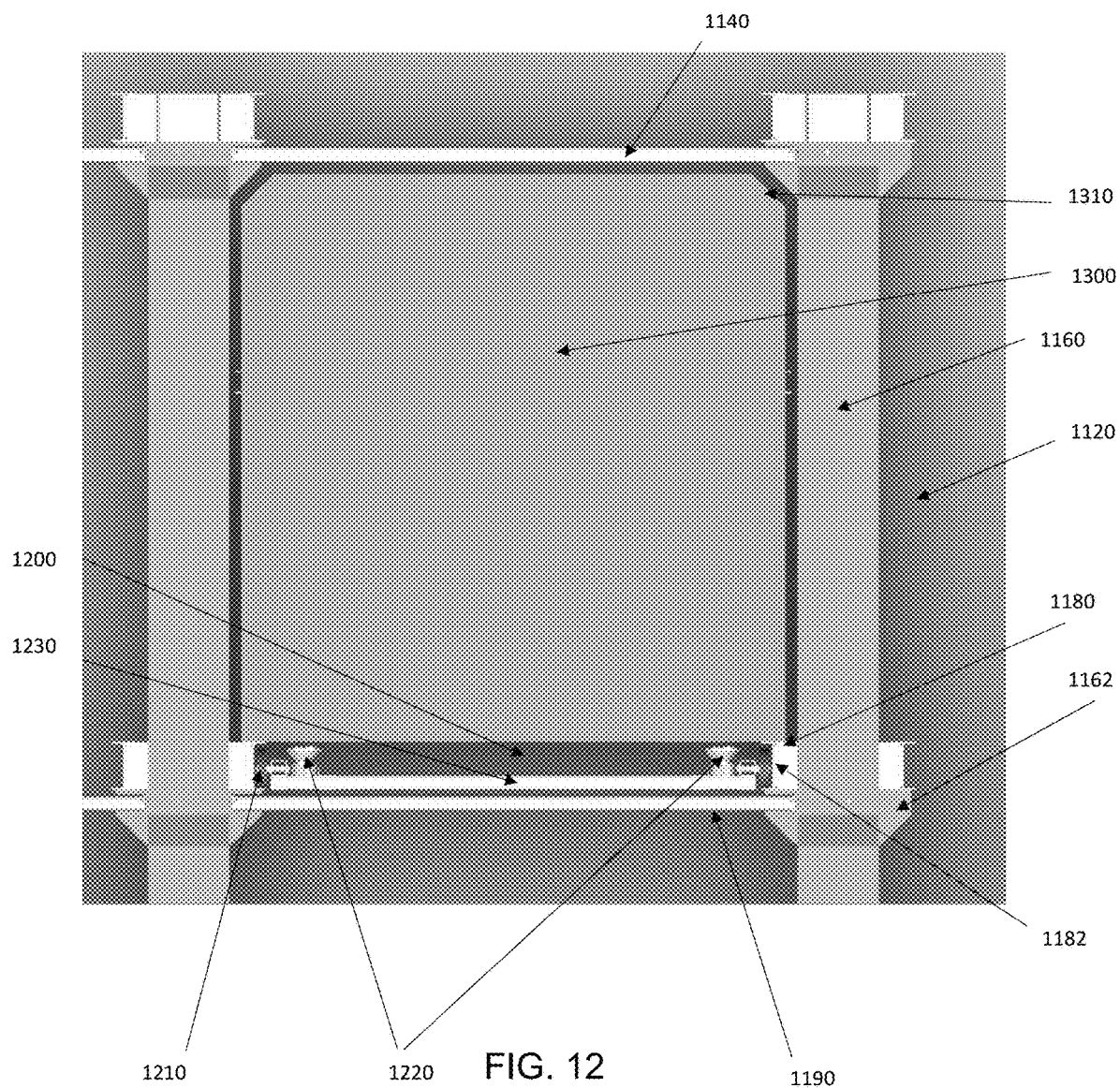
FIG. 12 is a schematic end view of the system in FIG. 10, showing the trolley movably coupled to beams of a row of the system and illustrating the block supported on the beans of said row.

The block 1300 can have a generally rectangular (e.g., square) shape when viewed from an end (see FIG. 12). In one implementation, the block 1300 can have one or more (e.g., a pair of) chamfered or truncated corners 1310 generally corresponding to a shape of a tapered end 1162 of the pillars 1160. A hook portion (e.g., C-shaped) 1183 (see FIG. 10) of the beams 1180 can be supported by tapered ends 1162 of the pillars 1160 that extend below the beams 1180 and can at least partially circumscribe the pillars 1160 that extend above the beams 1180 to facilitate coupling of the beams 1180 to the pillars 1160 and laterally fix the beams 1180 to the pillars 1160 (in the X direction). As discussed above, in one implementation the width 1122 and height 1142 of the row 1140 are generally equal and define a square shape. In one implementation, the block 1300 is sized to approximate the width 1122 and height 1142 of the row 1140 while allowing the block 1300 to pass through an opening of the row 1140.

A trolley 1200 can be movably coupled to the beams 1180 and can be selectively positioned under the block 1300 (see FIG. 12) that is supported on the beams 1180. Each row 1140 that has one or more blocks 1300 supported on the beams 1180 of the row 1140 can have one or more of the trolleys 1200 to move the blocks 1300 along the row 1140. The trolley 1200 can include wheels 1210 on opposite sides of a frame 1230, where the wheels 1210 move (e.g., rotate) within the channel 1182 of the (pair of) beams 1180 on which the blocks 1300 are supported (e.g., the wheels 1210 roll on the bottom flange of the beams 1180). The trolley 1200 also includes one or more actuatable support pistons 1220, for example on opposite sides of the frame 1230, that face a bottom side of the block 1300 when the trolley 1200 is positioned underneath the block 1300. The support pistons 1220 are actuatable (e.g., hydraulically, pneumatically, electrically via an electric motor) between a retracted state where the support pistons 1220 do not contact the block 1300 and an extended position where the support pistons 1220 are vertically displaced away from the frame 1230 (e.g., upward) to contact and lift the block 1300 (e.g., approximately 2 cm or 1 inch) above the beams 1180 (e.g., so that the weight of the block 1300 is supported solely by the support pistons 1220, allowing the trolley 1200 to move the block 1300 horizontally (e.g., along the X direction)). In one implementation, shown in FIGS. 10-11, the trolley 1200 can have two pairs of support pistons 1220 and two pairs of wheel assemblies 1210, each support piston 1220 aligned with one of the wheel assemblies 1210. In another implementation, the supports 1210 can be a platform with a width that generally corresponds with the width of the frame 1230, where the platform can move between a retracted position where it does not engage the bottom of the block 1300 and an extended position where it contacts and lifts the block 1300 off the beams 1180.

Once the trolley 1200 has lifted the block 1300 above the beams 1180 (e.g., so that the block 1300 is not in contact with the beams 1180), the trolley 1200 can translate the block 1300 along the row 1140 (e.g., horizontally in the X direction), for example toward the elevator shaft 1130 to transfer the block 1300 to the elevator cage 1400, as further described below.

The elevator cage 1400 has side walls 1412 (e.g., one or more vertical beams spaced from each other) and a bottom support 1420 (e.g., pair or rails) that extends between the side walls 1412. The elevator cage 1400 also has track portions 1484, 1486 that advantageously align with the beams 1180, allowing the trolley 1200 to travel into the elevator cage 1400 while supporting the block 1300 (e.g., extend between the sidewalls 1412 and over the bottom support 1420). The elevator cage 1400 has a top support 1430 that extends between the side walls 1412. The top support 1430 is coupled to one or more cables or ribbons (e.g., steel ribbons) 1520 to the electric motor-generator 1500 coupled via mounts 1510 to the elevator shaft 1130.

Once the trolley 1200 has positioned the block 1300 over the bottom support 1420, the support pistons 1220 can be actuated to lower the block 1300 onto the bottom support 1420. In one implementation, the trolley 1200 can then exit the elevator cage 1400 allowing the elevator cage 1400 to move the block 1300 vertically along the elevator shaft 1300. In another implementation, the trolley 1200 remains in the elevator cage 1400, and the elevator cage 1400 moves along the elevator shaft 1300 to another row or floor 1140 to deliver the block 1300, where the trolley 1200 can raise the block 1300 above the bottom support 1420 and exit the elevator cage 1400 onto the row 1140 with the block 1300 thereon. Once the block 1300 has been moved to the desired location, the trolley 1200 can retract the support pistons 1220 so that the block 1300 is supported on the beams 1180 and the trolley 1200 can move from under and move apart from the block 1300 (see FIGS. 10-11).

FIGS. 13-19 show a sequence of steps for moving a block 1300 along a row or floor 1140 of the frame or tower 1100 of the energy storage system 1000 and transferring the block 1300 to an elevator cage 1400' for moving block 1300 (e.g., to another elevation in the frame or tower 1100) via the elevator shaft 1130. The same sequence of steps in FIGS. 13-19 can be performed in reverse for lowering a block 1300 onto a row 1140 to transfer the block 1300 from the elevator cage 1400' in the elevator shaft 1130 to a row or floor 1140. One of skill in the art will recognize that the sequence of steps illustrated in FIGS. 13-19 and described below can be implemented into any row (e.g., all rows of the upper section 1102 and/or lower section 1104) of the energy storage and delivery system 1000, the energy storage and delivery system 1000' in FIG. 7 and the energy storage and delivery system 1000" in FIG. 8, so that the description below applies to the systems 1000, 1000', 1000" in FIGS. 5-8.

Figure 13:
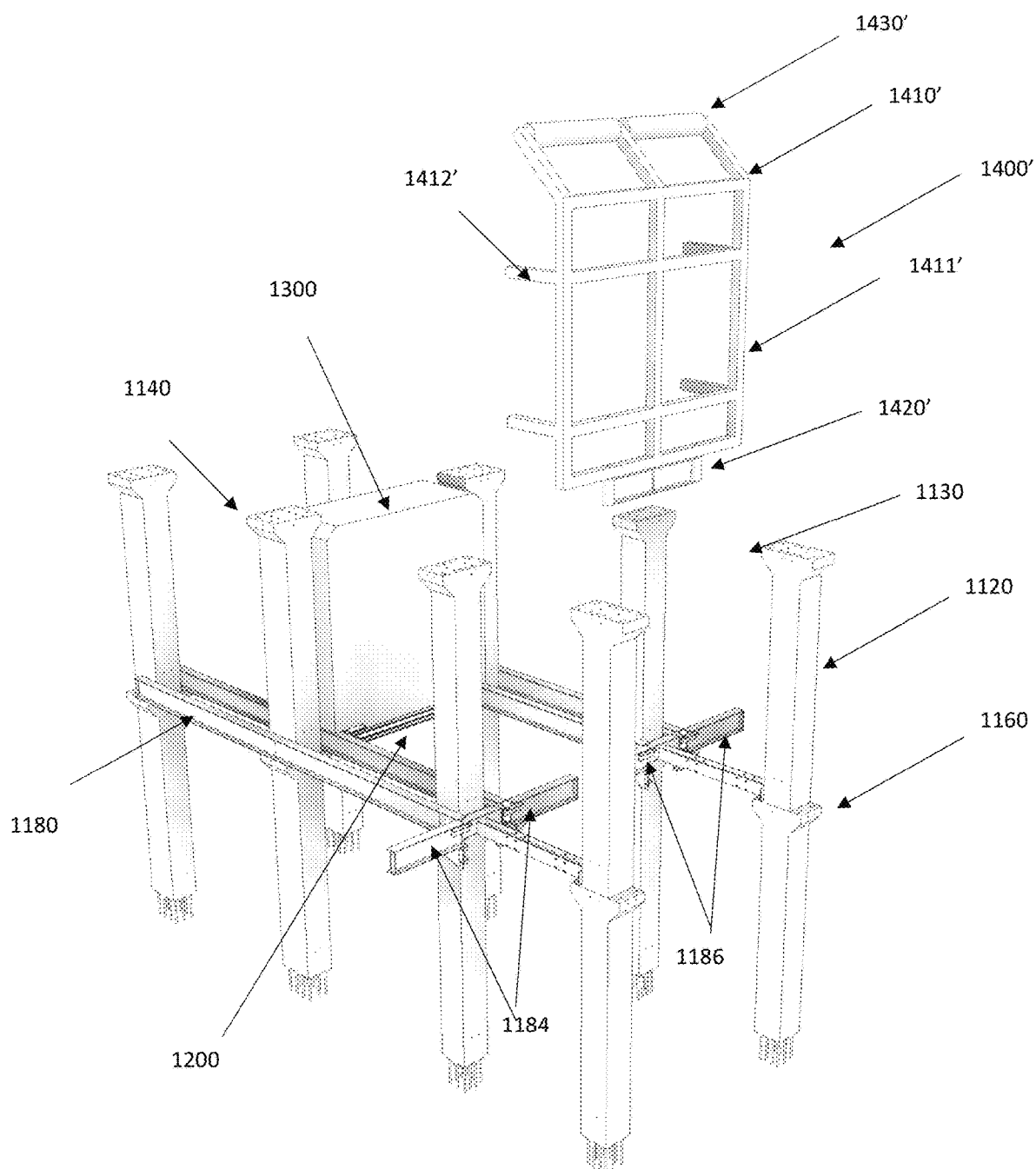
FIGS. 13-19 is a partial schematic view of the system of FIG. 5, illustrating a sequence of steps for moving a block along a row of the tower and transferring the block to an elevator cage for vertical movement in an elevator shaft of the system.

FIG. 13 shows a portion of a row 1140 of the frame or tower 1100 with a block 1300 disposed on the trolley 1200 as discussed above (e.g., the support pistons 1220 lift the block 1300 off the beams 1180). Actuatable track portions (e.g., cantilevered joints, butterfly joints) 1184, 1186 are disposed at ends of the beams 1180, for example proximate the elevator shaft 1130 along which the elevator cage 1400' moves. The actuatable track portions 1184, 1186 can be moved between a retracted position (e.g., shown in FIGS. 13, 19) where the track portions 1184, 1186 extend transverse (e.g., perpendicular) to the beams 1180 and an extended position (e.g., shown in FIGS. 14-18) where the track portions 1184, 1186 extend in-line with the beams 1180. In one implementation, in the retracted position the track portions 1184, 1186 do not extend into the elevator shaft 1130 and in the extended position the track portions 1184, 1186 extend into the elevator shaft 1130. The track portions 1184, 1186 can be actuated electrically, pneumatically or hydraulically between the retracted and extended positions.

The elevator cage 1400' has a frame 1410' with an open bottom and open (front) side that faces the row or floor. In one implementation, the frame 1410' has a rear support 1411' that can be positioned proximate a surface of the block 1300 when the elevator cage 1400' is aligned and/or coupled to the block 1300, and has one or more side arms 1412' that extend from the rear support 1411' and can extend proximate sides of the block 1300 when the elevator cage 1400' is aligned and/or coupled to the block 1300 (see FIGS. 16-18). The rear support 1411' can have generally the same area as a face of the block 1300. The elevator cage 1400' can have one or more (e.g., a pair of) actuatable supports 1420'. The actuatable supports 1420' can be actuated between a retracted position (see FIGS. 13-16) in which they are co-planar or parallel to the rear support 1411' and an extended position (see FIGS. 17-19) in which they extend generally transverse to a plane of the rear support 1411'. In the extended position (see FIGS. 17-19), the actuatable supports 1420' can be positioned under the bottom of the block 1300 (e.g., oriented similar to forks in a fork lift) and can support the block 1300 as the elevator cage 1400' is moved vertically along the elevator shaft 1130. The actuatable supports 1420' can be actuated electrically, pneumatically or hydraulically between the retracted and extended positions. The elevator cage 1400' has proximal beams 1430' via which the elevator cage 1400' is lifted and lowered by the motor-generator 1500 (e.g., by cables or steel ribbons that are coupled to, for example wrapped around the, proximal beams 1430). In the illustrated implementation, the elevator cage 1400' is sized to carry one block 1300 at a time between the upper section 1102 and the lower section 1104 of the frame or tower 1100. In other implementations, discussed further below, the elevator cage 1400' can be sized to carry more than one block 1300 (e.g., two, three, four) at a time between the upper section 1102 and the lower section 1104 of the frame or tower 1100.

FIG. 13 shows the block 1300 on the trolley 1200 being moved toward the elevator shaft 1130. The track portions 1184, 1186 are in the retracted position (e.g., transverse to the beams 1180), which allows the elevator cage 1400' to pass through the elevator shaft 1130 (e.g., after delivering a block 1300 to another floor 1140 without interference from the track portions 1184, 1186). The elevator cage 1400' is at a higher vertical location than (e.g., in a position vertically displaced from) the floor 1140 and its actuatable supports 1420' are in the retracted position (e.g., co-planar or parallel to the rear support 1411').

Figure 14:
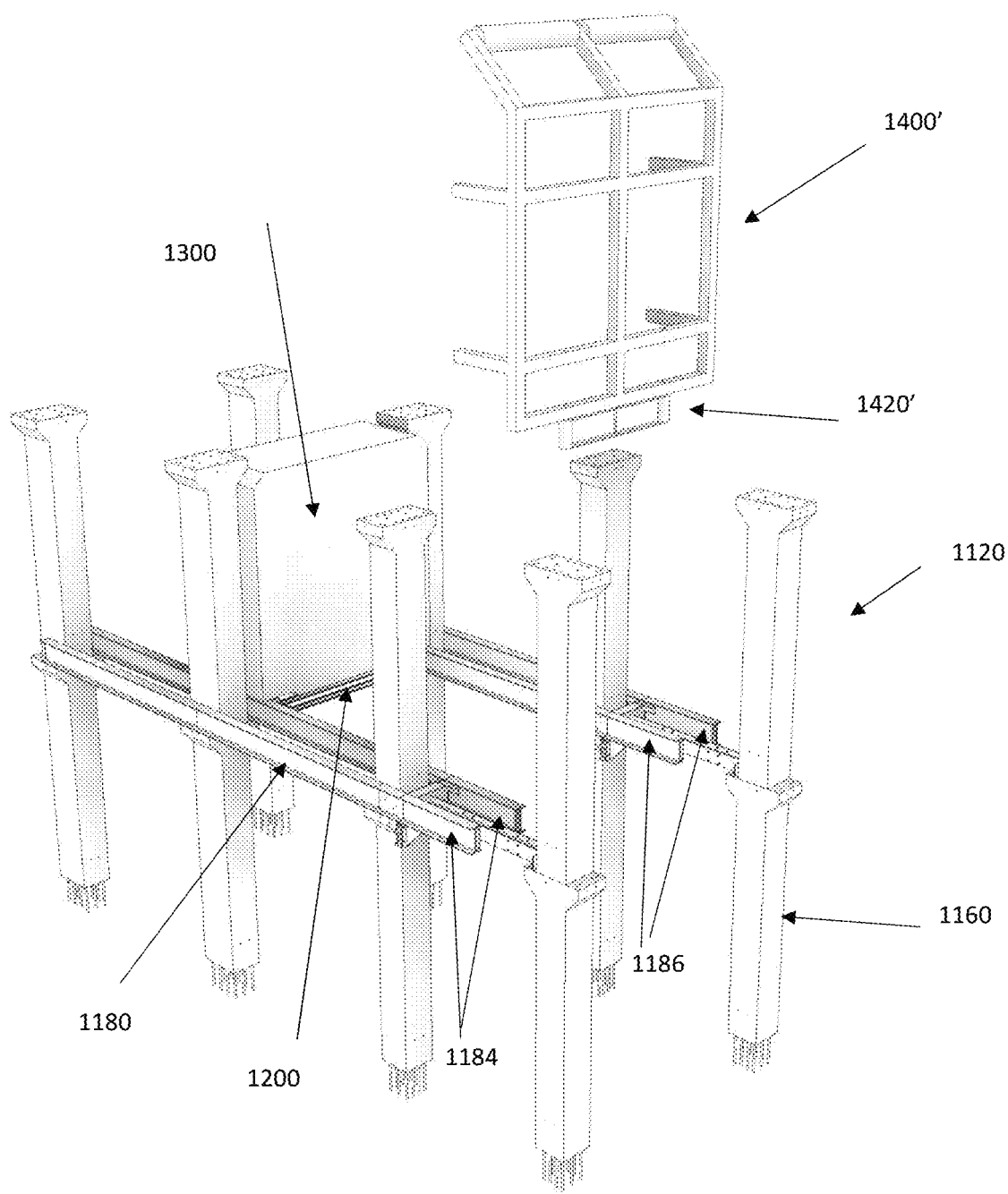

FIG. 14 shows the track portions 1184, 1186 actuated into the extended position (e.g., in-line with the beams 1180). The elevator cage 1400' remains at a higher vertical location than (e.g., in a position vertically displaced from) the floor 1140 and its actuatable supports 1420' are in the retracted position (e.g., co-planar or parallel to the rear support 1411').

Figure 15:
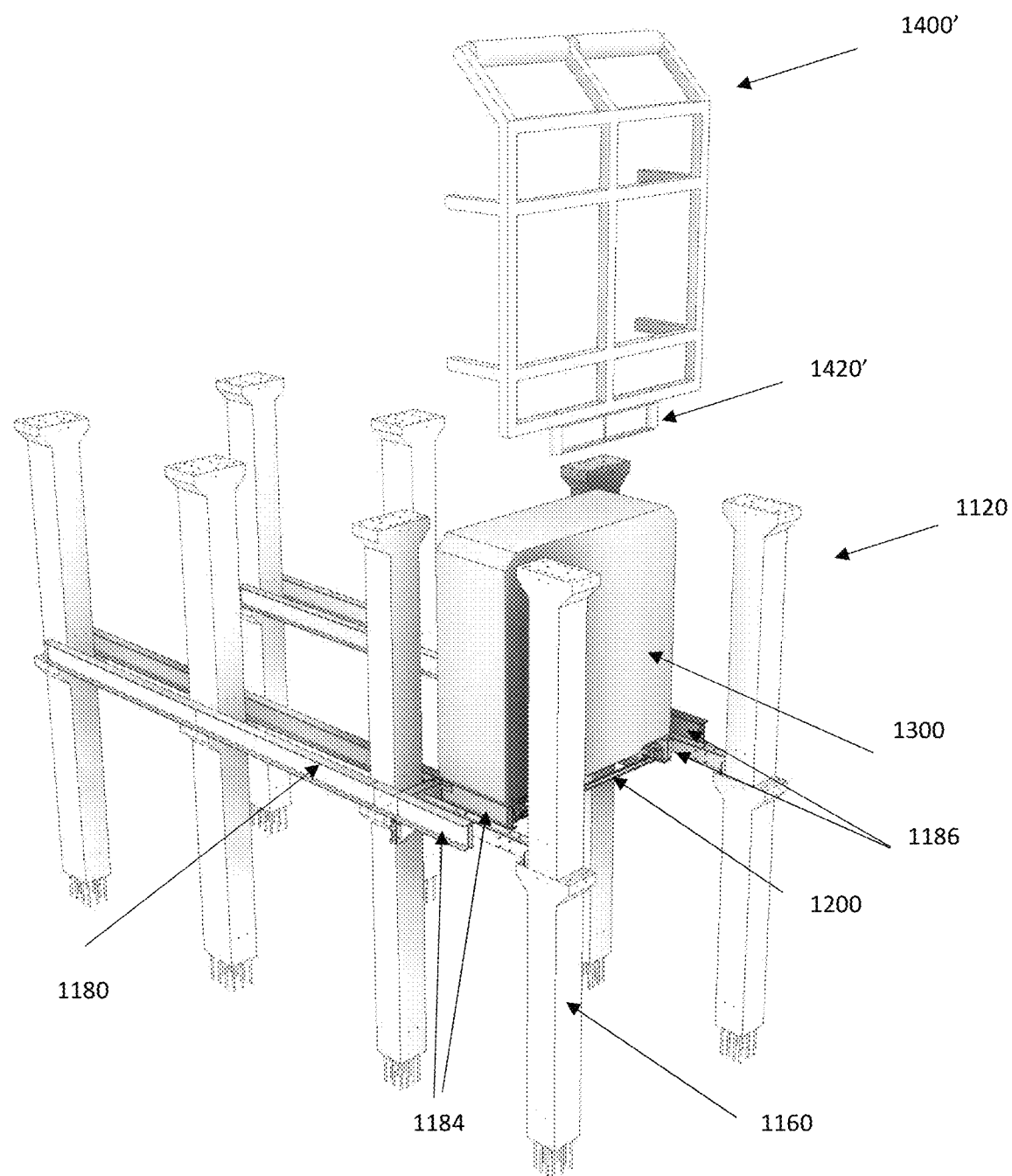

FIG. 15 shows that the trolley 1200 has moved the block 1300 along the beams 1180 and onto the track portions 1184, 1186 (cantilevered track portions) in the extended positions. The trolley 1200 can actuate the support pistons 1220 to lower the block 1300 onto the track portions 1184, 1186. The elevator cage 1400' remains at a higher vertical location than (e.g., in a position vertically displaced from) the floor 1140 and its actuatable supports 1420' are in the retracted position (e.g., co-planar or parallel to the rear support 1411').

Figure 16:
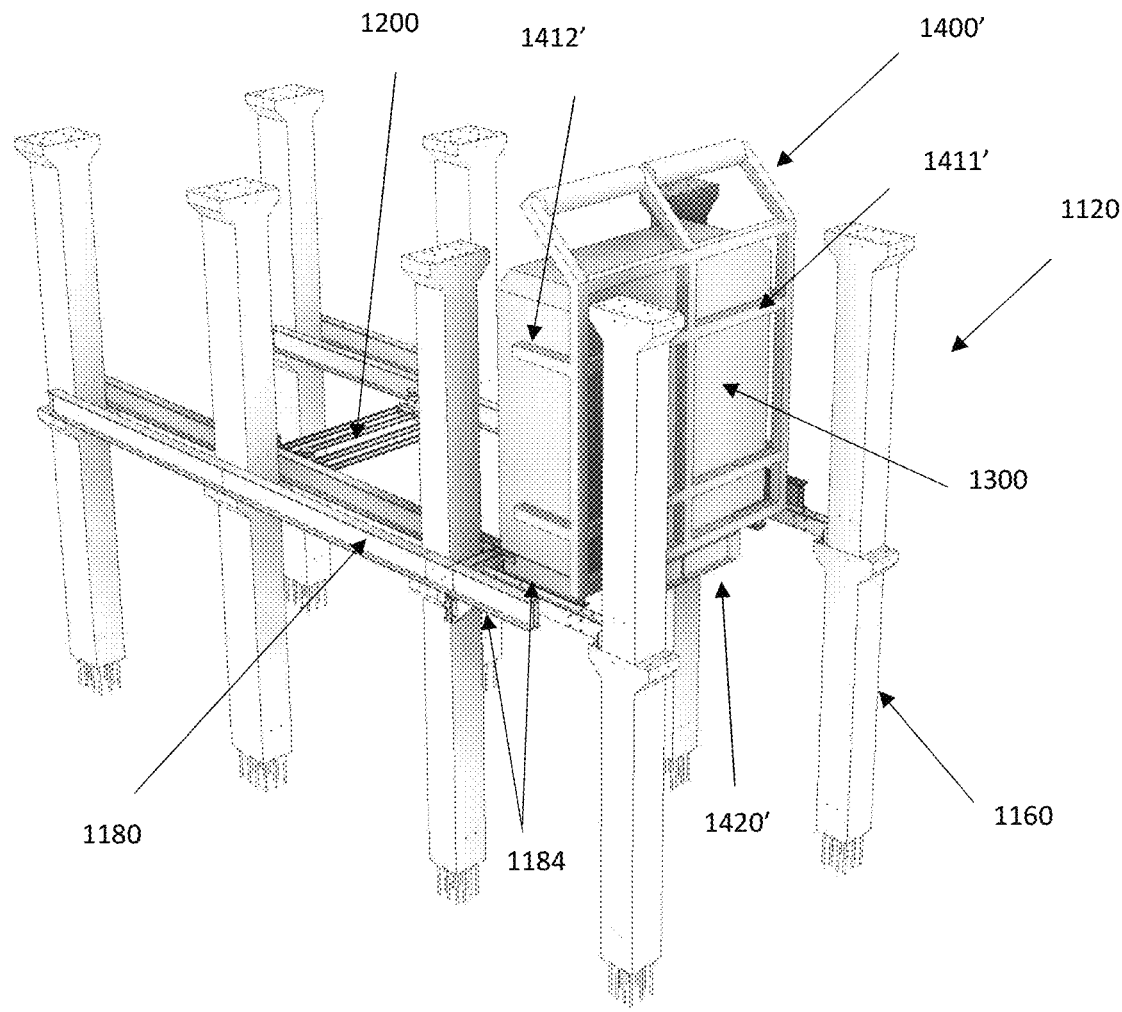

FIG. 16 shows the trolley 1200 have moved away from the block 1300, which remains supported on the track portions 1184, 1186 in the extended positions. The elevator cage 1400' is lowered onto the block 1300 so that the rear support 1411' of the frame 1410' is adjacent a face surface of the block 1300 and the side arms 1412' of the frame 1410' are adjacent sides of the brock 1300 that are transverse (e.g., perpendicular) to the face surface of the block 1300. The elevator cage 1400' can be lowered so that the actuatable supports 1420' are at a location vertically below the bottom of the block 1300, where the actuatable supports 1420' are in the retracted position (e.g., co-planar or parallel to the rear support 1411').

Figure 17:
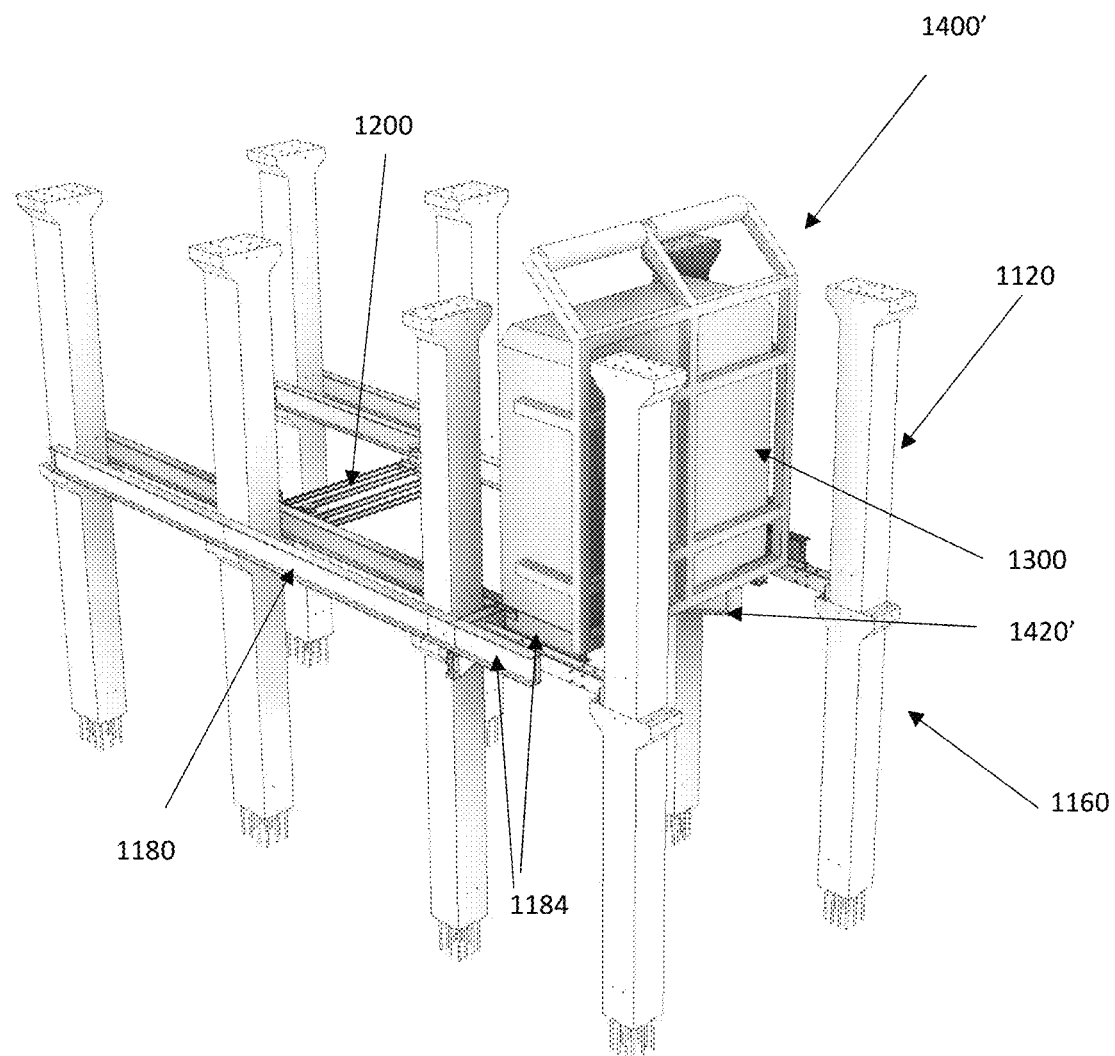
Figure 18:
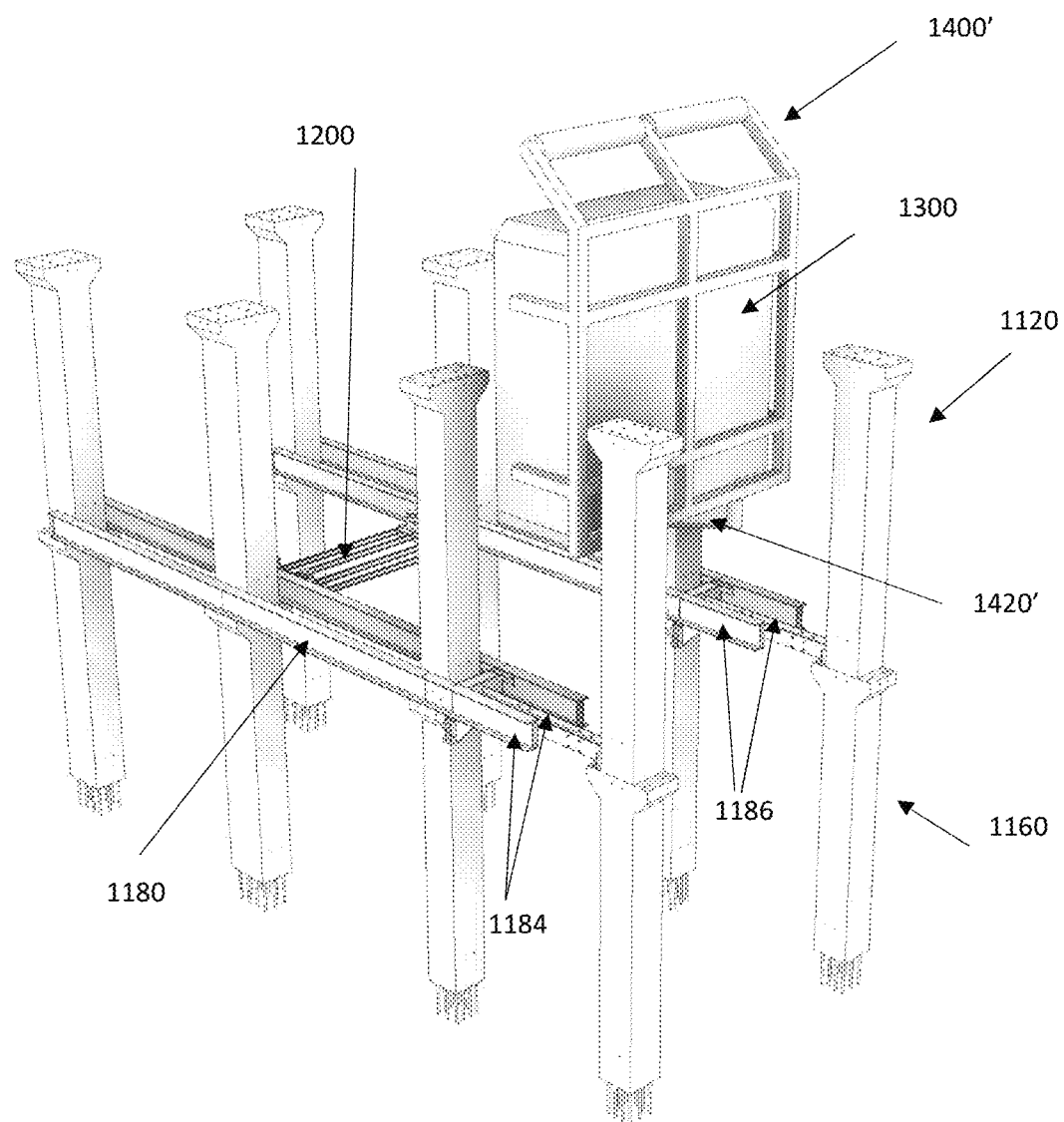
Figure 19:
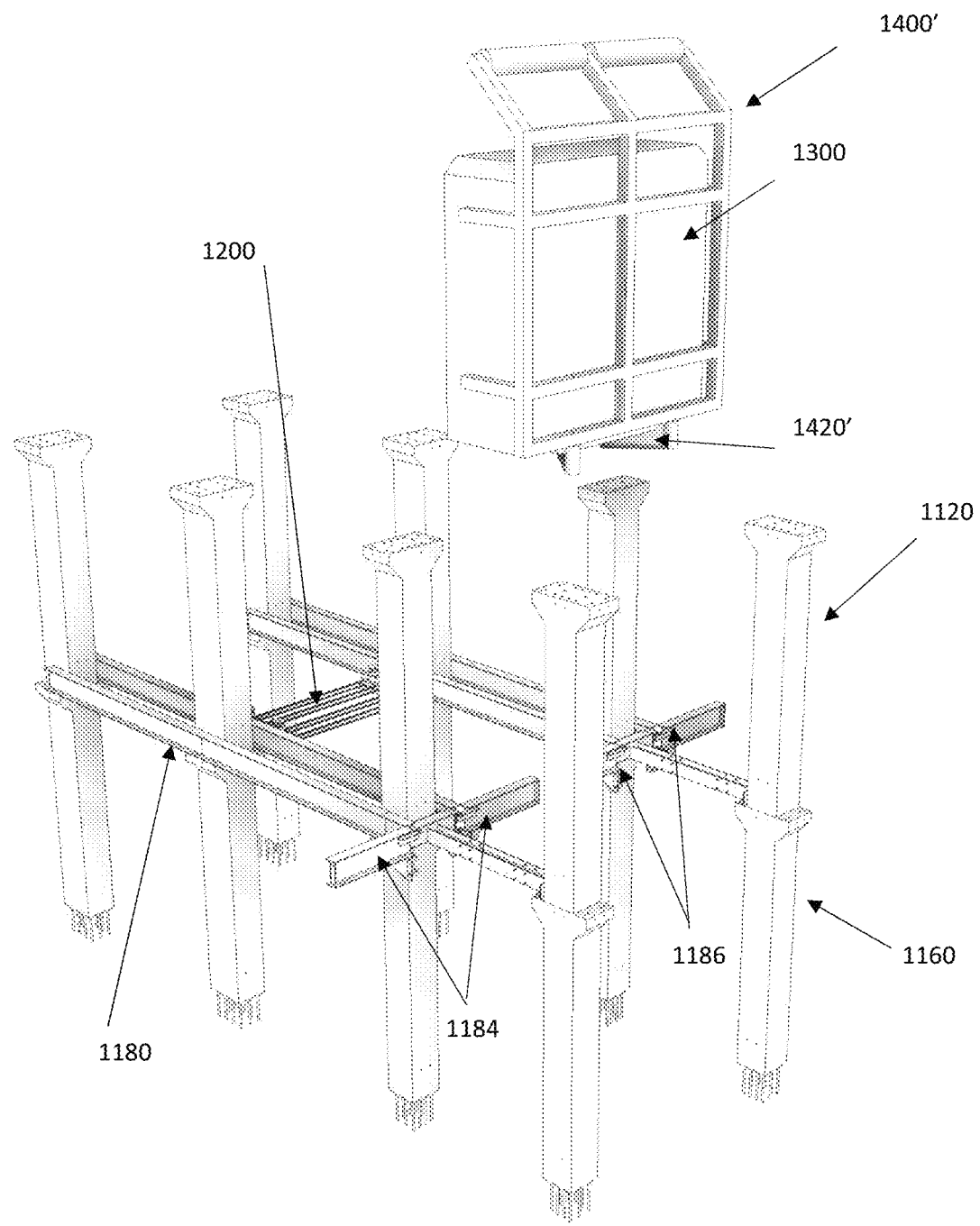

FIG. 17 shows the actuatable supports 1420' moved to the extended position (e.g., transverse to a plane of the rear support 1411') so that they are positioned under a surface of the block 1300 (e.g., like forks of a fork lift). The elevator cage 1400' can then move upward, causing the actuatable supports 1420' (in the extended position) to contact the bottom of the block 1300 and lift the block 1300 from the track portions 1184, 1186. FIG. 18 shows the elevator cage 1400' moving upward with the block 1300, which is supported on the bottom by the actuatable supports 1420' (in the extended position), supported on the sides by the side arms 1412' and supported on a face surface by the rear support 1411' of the frame 1410'. FIG. 19 shows the track portions 1184, 1186 moved to the retracted positions (e.g., transverse to the beams 1180) so that the track portions 1184, 1186 do not protrude into (e.g., obstruct) the elevator shaft 1130, allowing the elevator cage 1400' with the block 1300 to move therethrough without interference from the track portions 1184, 1186.

Figure 20:
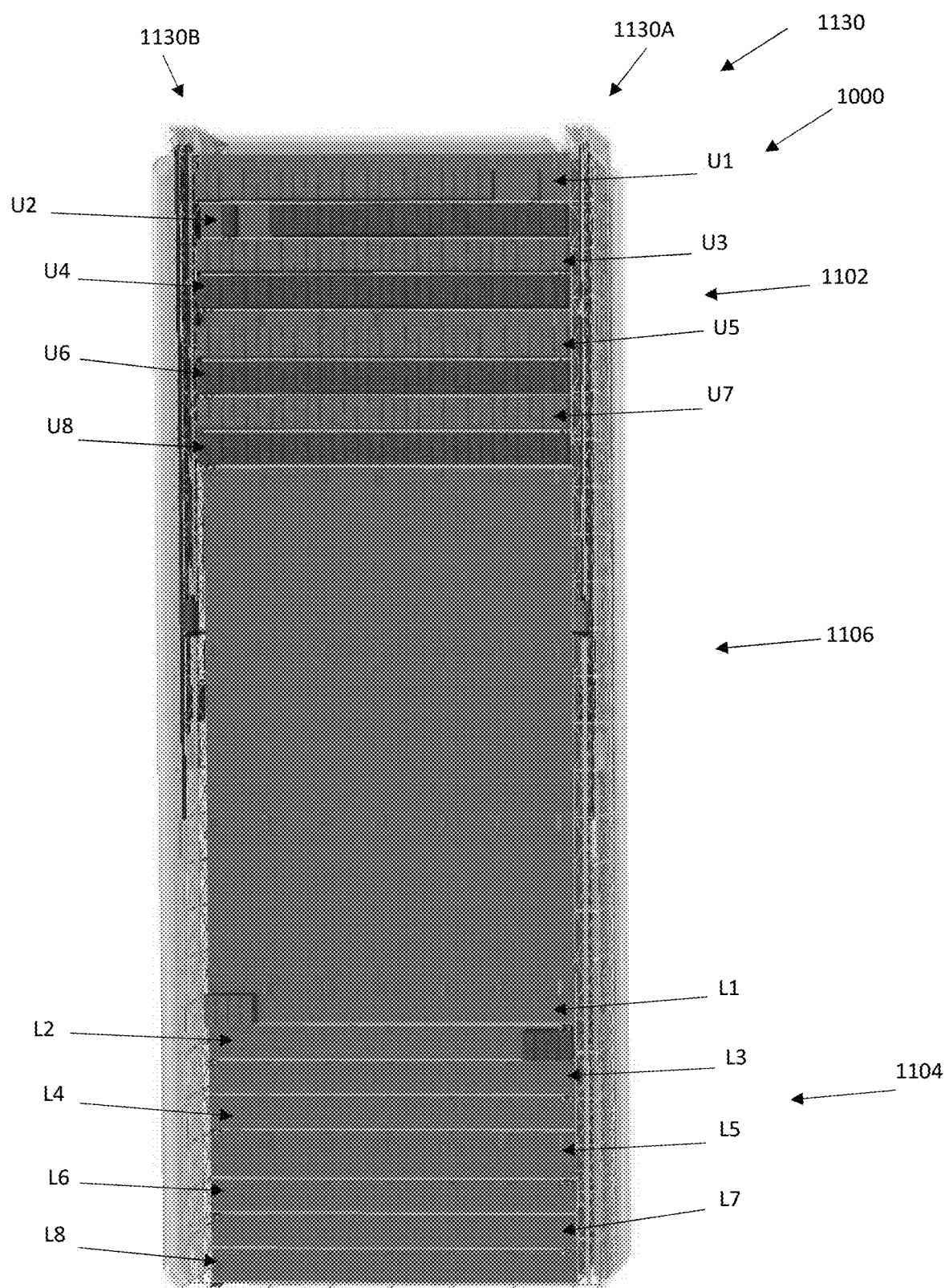
FIG. 20 is a schematic end view of the system in FIG. 5 illustrating the arrangement of blocks in the tower and movement of blocks from an upper portion of the tower to a lower portion of the tower to generate electricity.
Figure 20A:
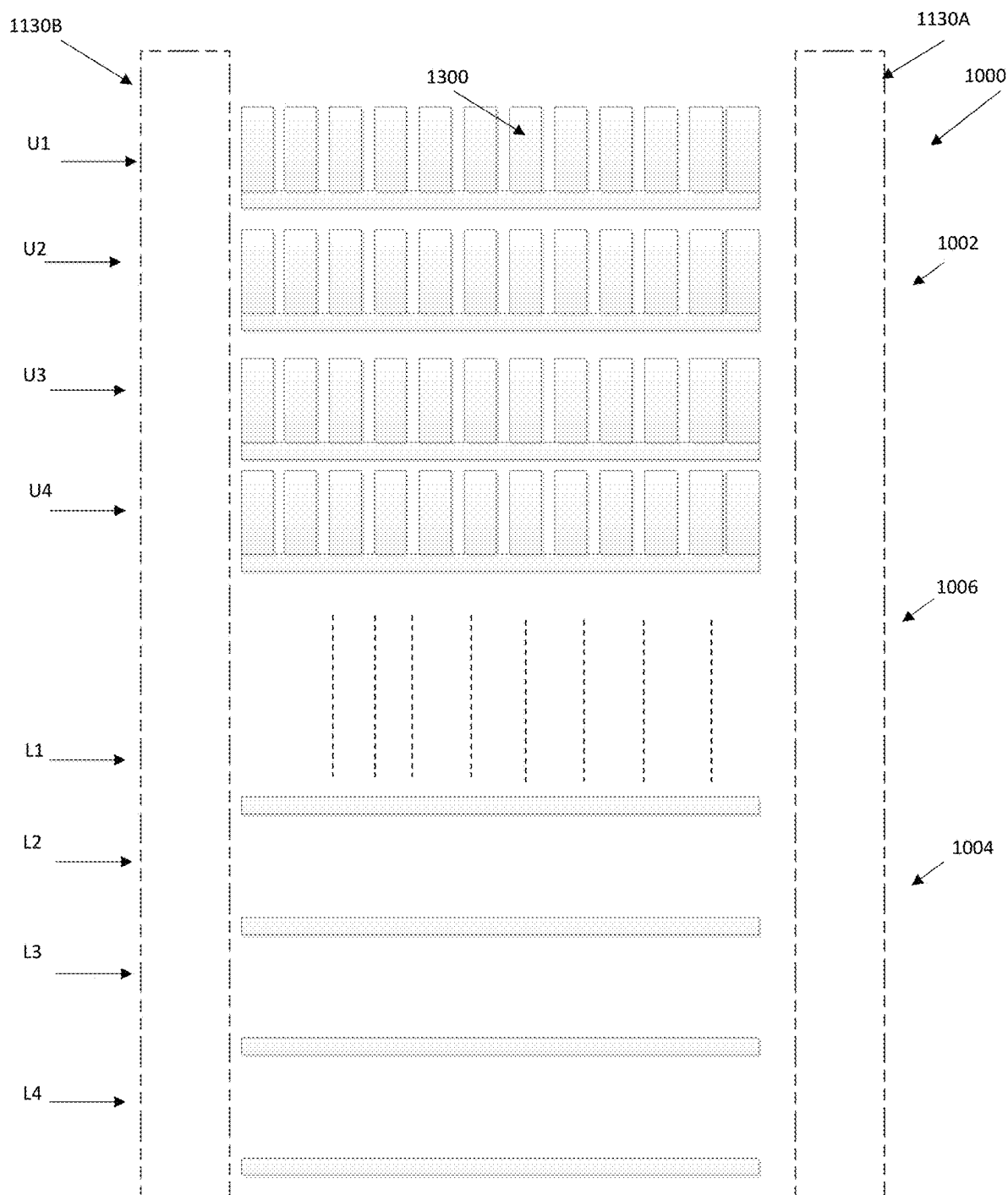
FIGS. 20A-20D are schematic end views of the system in FIG. 5 illustrating the movement of blocks from an upper portion of the tower to a lower portion of the tower to generate electricity.

FIG. 20 is a schematic end view of the energy storage and delivery system or module 1000 illustrating the arrangement of blocks 1300 in the frame or tower 1100 and movement of blocks 1300 between rows 1140 in the upper section 1102 and rows 1140 of the lower section 1104 of the frame or tower 1100 to store energy or generate electricity. One of skill in the art will recognize that process described below can be implemented in the energy storage system 1000' in FIG. 7 and the energy storage system 1000" in FIG. 8, so that the description below also applies to the systems 1000', 1000" in FIGS. 7-8. Ballast weights or blocks 1300 are moved from the rows or floors 1140 in the upper section 1102 to corresponding rows or floors 1140 in the lower section 1104 to generate electricity (e.g., via the motor-generator 1500), for example for delivery to the electrical grid or for use of by the intermediate section 1106 (e.g., to power a data center or power lights for vertical farming). Ballast weights or blocks 1300 are moved from the rows or floors 1140 in the lower section 1104 to corresponding rows or floors 1140 in the upper section 1102 to store electrical energy as potential energy of the blocks 1300.

Ballast weights or blocks 1300 can be disposed in rows 1140 in the upper section 1102 of the tower or frame 1100 (e.g., in rows U1 to U8). Blocks 1300 in each row 1140 in the upper section 1102 can be moved horizontally (in the X direction) by a trolley 1200 in each row U1-U8 to the elevator shafts 1130A, 1130B to be lowered by its associated elevator cage 1400, 1400' vertically (in the Z direction) to a corresponding row 1140 (e.g., rows L1 to L8) in the lower section 1104. The blocks 1300 delivered to the rows L1 to L8 are moved horizontally by a trolley 1200 in each of the rows L1-L8. The blocks 1300 can be lowered by the elevator cage 1400, 1400' via the elevator shafts 1130A, 1130B at the ends of the rows 1140, for example via a sequence of movements described above in connection with FIGS. 9 and 13-19. The elevator cage 1400, 1400' and fixed elevator shafts 1130A, 1130B at the ends of the rows 1130 provide for efficient, fast and guided movement of the blocks 1300 between the upper section 1102 and the lower section 1104. During operation of the energy storage and delivery system 1000, motion of the elevator cage 1400, 1400' in the right elevator shaft 1130A is interleaved with the motion of the elevator cage 1400, 1400' in the left elevator shaft 1130B as discussed below. Though the system 1000 in FIG. 20 shows eight rows U1-U8 in the upper section 1102 and eight rows L1-L8 in the lower section 1104 that support blocks 1300, one of skill in the art will recognize that the number of rows 1140 can vary and the same process described herein for moving blocks 1300 from a row 1140 in the upper section 1102 to a corresponding row 1140 in a lower section 1104, and how the blocks 1300 are distributed, applies irrespective of the total number of rows 1140 in the upper section 1102 and in the lower section 1104.

With reference to FIG. 20, every block 1300 removed from a row 1140 in the upper section 1102 is advantageously replaced by another block 1300 in the lower section 1104 so that the average foundation load and/or average distribution of load on the ground (e.g., foundation) of the frame or tower 1100 remains substantially constant (e.g., constant). In one implementation, every block removed from a row 1140 in the upper section 1102 is advantageously replaced by another block 1300 in a row 1140 of the lower section 1104 in the same column 1120 location, such that the load remains the same in said column 1120. For example, where the upper section 1102 has eight rows U1-U8 filled with blocks 1300 and the lower section 1104 has eight rows L1-L8 to which blocks 1300 can be moved from the upper section 1102, there are eight blocks 1300 in any one column 1120. During operation of the system 1000, each column 1120 maintains the same number of blocks 1300 (e.g., eight blocks), advantageously maintaining the frame or tower 1100 under a balanced load (e.g., every column 1120 maintains substantially the same load). Therefore, the load on the foundation (or ground) of the frame or tower 1100 does not change during operation of the system 1000, so the foundation is advantageously not stressed (e.g., cyclically) or experience differential settlement by the movement of the blocks 1300 between the rows or floors 1140 in the upper section 1102 and the rows or floors 1140 in the lower section 1104.

With continued reference to FIG. 20, the blocks 1300 in row U1 in the upper section 1102 can be lowered to the row L1 in the lower section 1104 to generate electricity. Similarly, blocks 1300 in row U2 can be lowered to row L2, blocks 1300 in row U3 can be lowered to row L3, blocks 1300 in row U4 can be lowered to row L4, blocks 1300 in row U5 can be lowered to row L5, blocks 1300 in row U6 can be lowered to row L6, blocks 1300 in row U7 can be lowered to row L7, and blocks 1300 in row U8 can be lowered to row L8. The blocks in any row 1140 in the upper section 1102 travels the same vertical distance to the corresponding row 1140 in the lower section 1104, such that each block 1300 experiences the same vertical jump. As shown in FIG. 20, blocks 1300 in a subset of the rows 1140 (e.g., row U1, U3, U5 and U7) are lowered via one elevator shaft 1130A and the rest of the rows 1140 (e.g., row U2, U4, U6 and U8) are lowered via the other elevator shaft 1130B. As discussed above, the intermediate section 1106 remains free of blocks and can be used for other purposes.

Blocks 1300 can be moved simultaneously between the upper section 1102 and lower section 1104 via the elevator shafts 1130A, 1130B. For example, a block 1300 can be lowered from row U1 to row L1 via elevator shaft 1130A and transferred to a trolley 1200 (e.g., in a reverse sequence to that described above for FIGS. 13-19), which can move the block 1300 horizontally toward the opposite end of the row L1 from the location on row U1 from which the block 1300 was taken. Substantially simultaneously, a block 1300 can be lowered from row U2 to row L2 via the elevator shaft 1130B and transferred to a trolley 1200 (e.g., in a reverse sequence to that described above for FIGS. 13-19), which can move the block 1300 horizontally toward the opposite end of the row L2 from the location on row U2 from which the block 1300 was taken. As discussed above, this advantageously allows the average foundation load and/or average distribution of load on the ground (e.g., foundation) of the frame or tower 1100 remains substantially constant.

Advantageously, the elevator cage 1400, 1400' moves fast between the rows U1-U8 in the upper section 1102 and the rows L1-L8 in the lower section 1104 of the frame or tower 1100 (e.g., because the cost of the power used to move the blocks 1300 decreases with the speed the blocks 1300 are moved by the elevator cage 1400, 1400'). Because the elevator cage 1400, 1400' moves much faster than the trolley 1200, in one implementation the elevator cage 1400, 1400' does not return to the same row 1140 in the upper section 1102 until it after it has moved a block 1300 from the rest of the rows 1140 in the upper section 1102 that service the associated elevator shaft 1130A, 1130B to their corresponding rows 1140 in the lower section 1104.

Figure 20B:
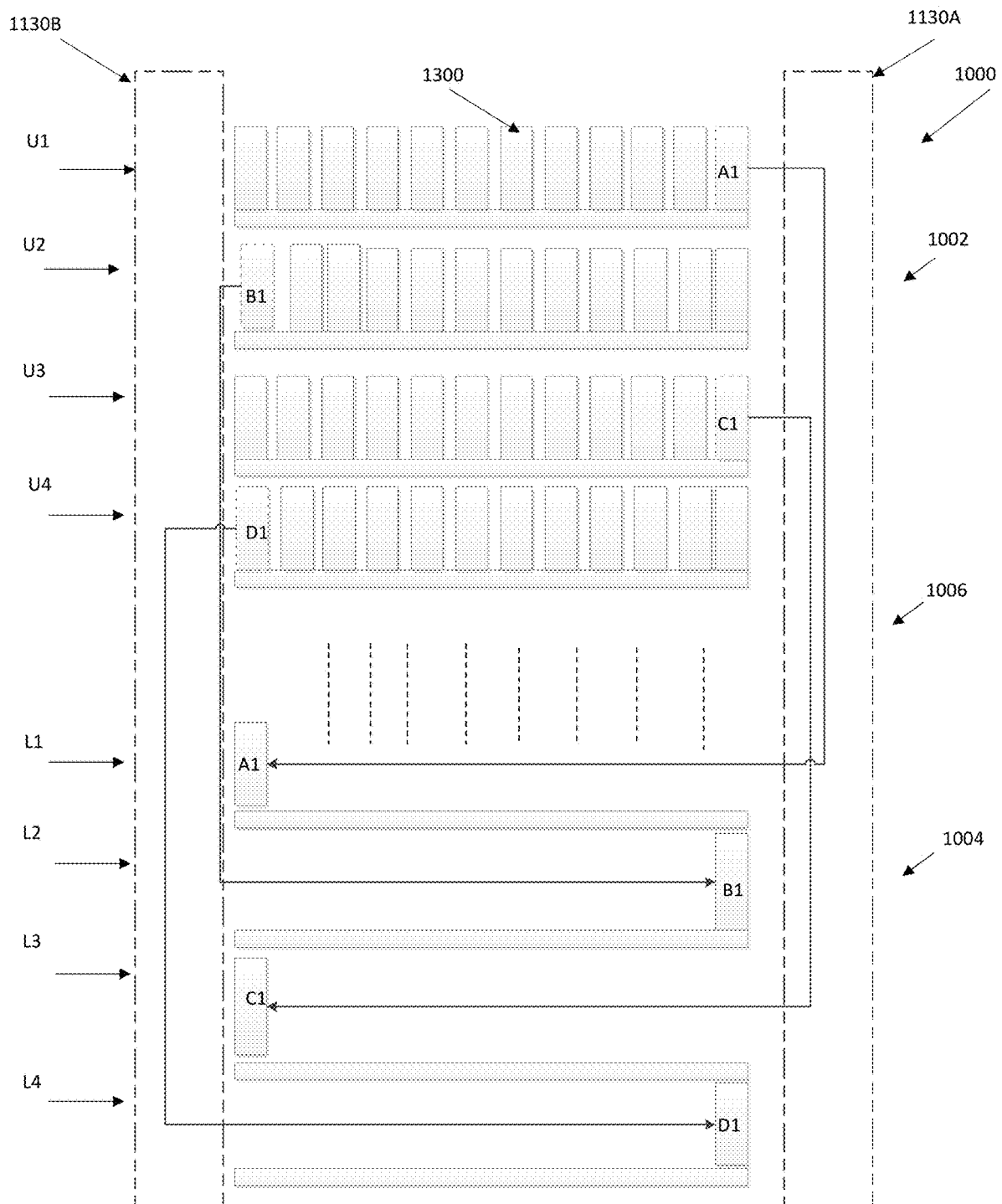
Figure 20C:
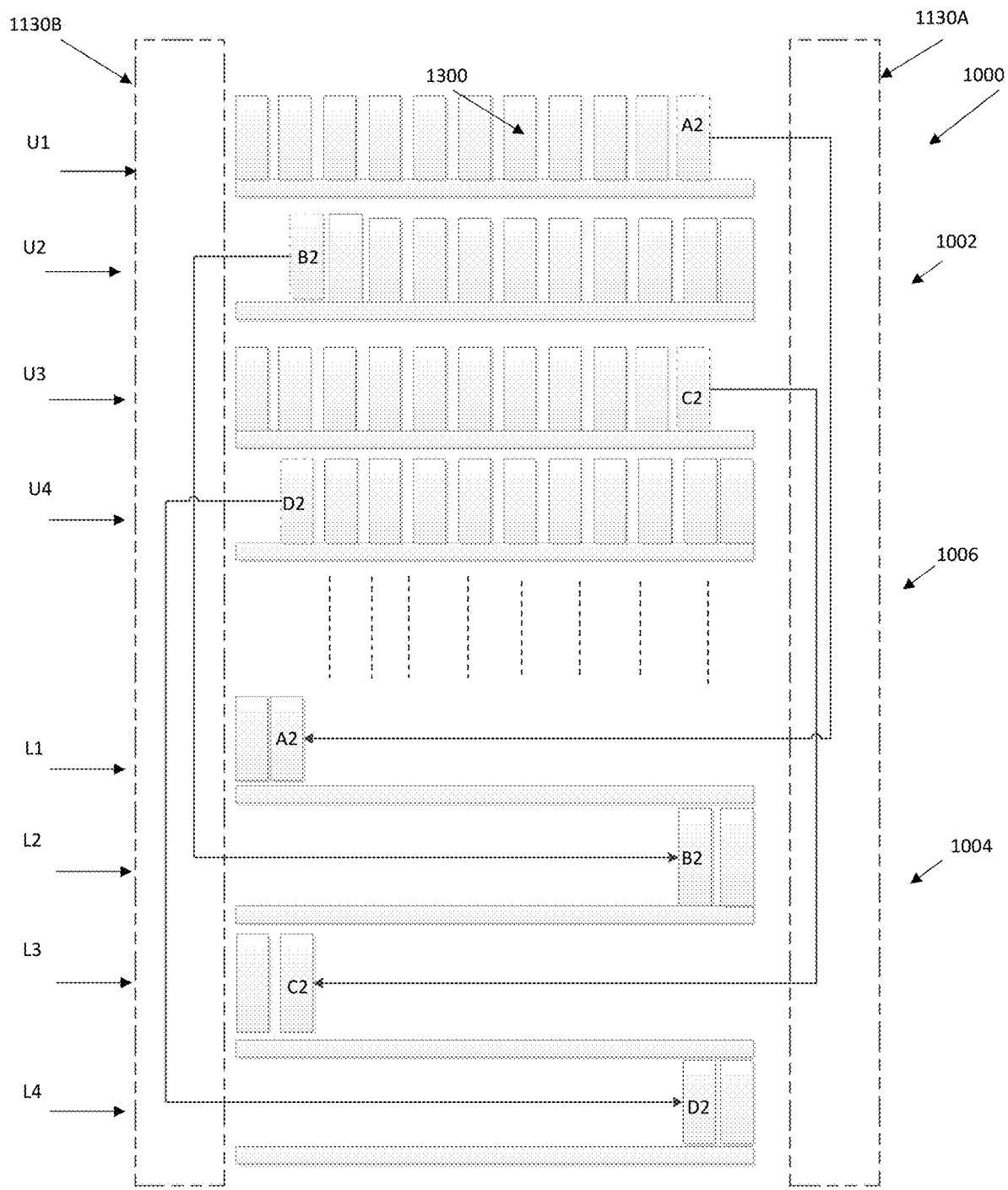
Figure 20D:
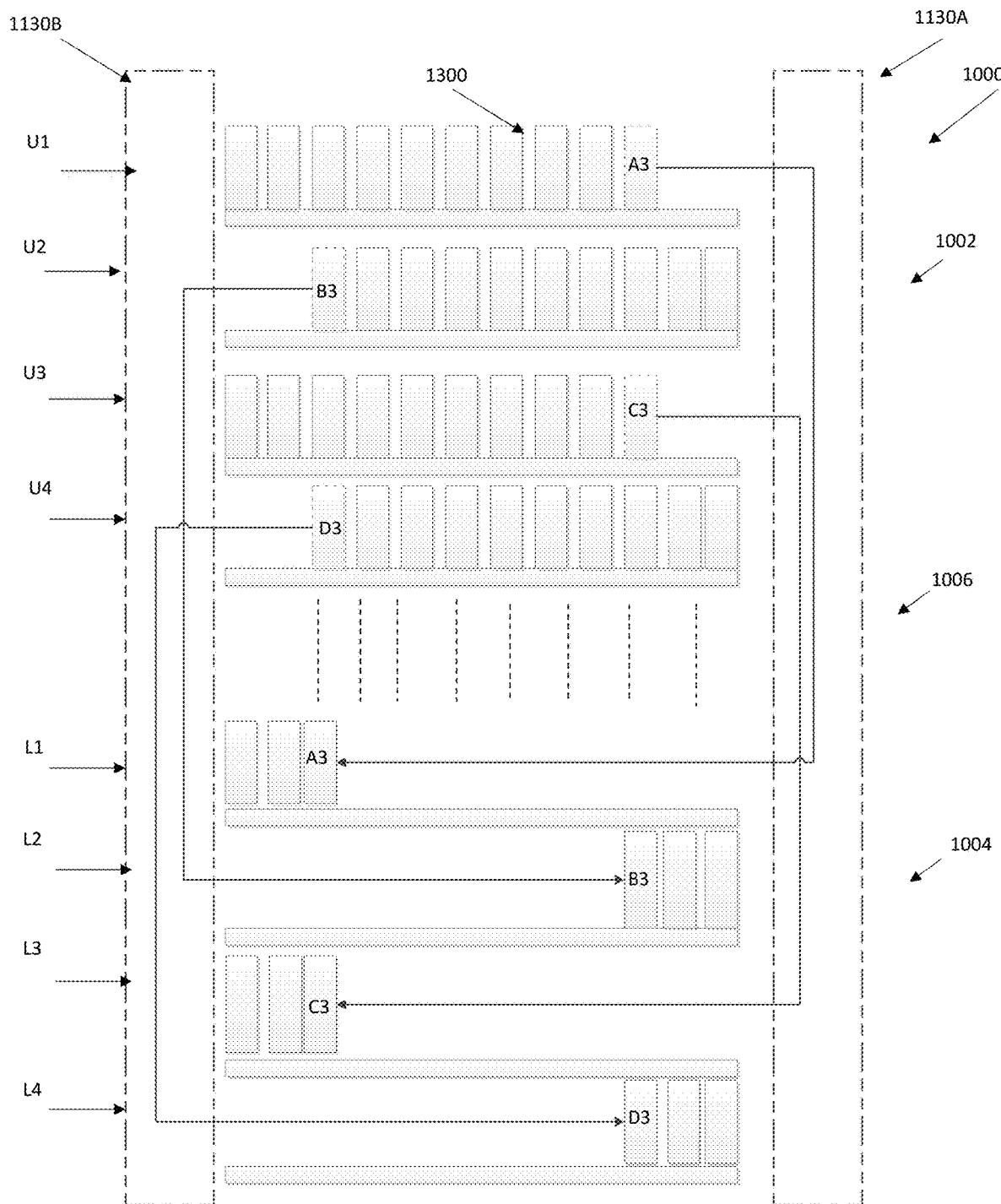

FIGS. 20A-20D illustrate a process for moving the blocks 1300 from the upper section 1102 to the lower section 1104 via the elevator shafts 1130A, 1130B (e.g., with the elevator cage 1400, 1400') to generate electricity. As shown in FIG. 20B, block A1 is moved via the elevator shaft 1130A from one end of row U1 to row L1 and moved to the opposite end of row L1. Similarly, block B1 is moved via the elevator shaft 1130B from one end of row U2 to row L2 and moved to the opposite end of row L2. Once block A1 has been delivered to row L1 as described above, the elevator cage in elevator shaft 1130A returns to the next row U3 in the upper section 1102 and moves block Cl via the elevator shaft 1130A to its corresponding row L3 in the lower section 1104, and moves the block C 1 to the opposite end of the row L3. Similarly, once block B1 has been delivered to row L2 as described above, the elevator cage in elevator shaft 1130B returns to the next row U4 in the upper section 1102 and moves block D1 via the elevator shaft 1130B to its corresponding row L4 in the lower section 1104, and moves the block D1 to the opposite end of the row L4. The process can continue in this fashion for the remaining rows in the upper section 102 (e.g., for rows U5 to U8 in FIG. 20). With continued reference to FIG. 20B, once a block 1300 has been lowered from each row (e.g., U1-U4) in the upper section 102 to its corresponding row (e.g., L1-L4) in the lower section 104, the elevator cages 1400, 1400' in the respective elevator shafts 1130A, 1130B again perform the same steps described above to move the next block (e.g., A2-D2) in the rows (U1-U4) in the upper section 102 to their corresponding rows (L1-L4) in the lower section, as shown in FIG. 20C. Similarly, once the second block 1300 has been lowered from each row (e.g., U1-U4) in the upper section 102 to its corresponding row (e.g., L1-L4) in the lower section 104, the elevator cages 1400, 1400' in the respective elevator shafts 1130A, 1130B again perform the same steps described above to move the next block (e.g., A3-D3) in the rows (U1-U4) in the upper section 102 to their corresponding rows (L1-L4) in the lower section, as shown in FIG. 20D, and so on. Because the elevator cage 1400, 1400' travels much faster vertically along the elevator shafts 1130A, 1130B than the trolley(s) 1200 travel horizontally along the rows 1140 (e.g., U1-U4 and/or L1-L4), the sequence described above advantageously gives the trolley 1200 sufficient time to travel along the row 1140 to pick-up another block 1300 and move it proximate the elevator shaft 1130A, 1130B by the time the elevator cage 1400, 1400' travels to the same row, thereby allowing the system 1000 to operate efficiently. The process described above advantageously allows the load on the foundation (e.g., average load) and/or the distribution of load (e.g., average load) on the ground (e.g., foundation) of the frame or tower 1100 remains substantially constant.

In one implementation, blocks 1300 are moved one at a time (e.g., using the carriage 1400, 1400' described above in connection with FIGS. 9-19). In another implementation, the carriage or elevator can move multiple blocks 1300 at one time, as shown in FIGS. 21-22B.

Figure 21:
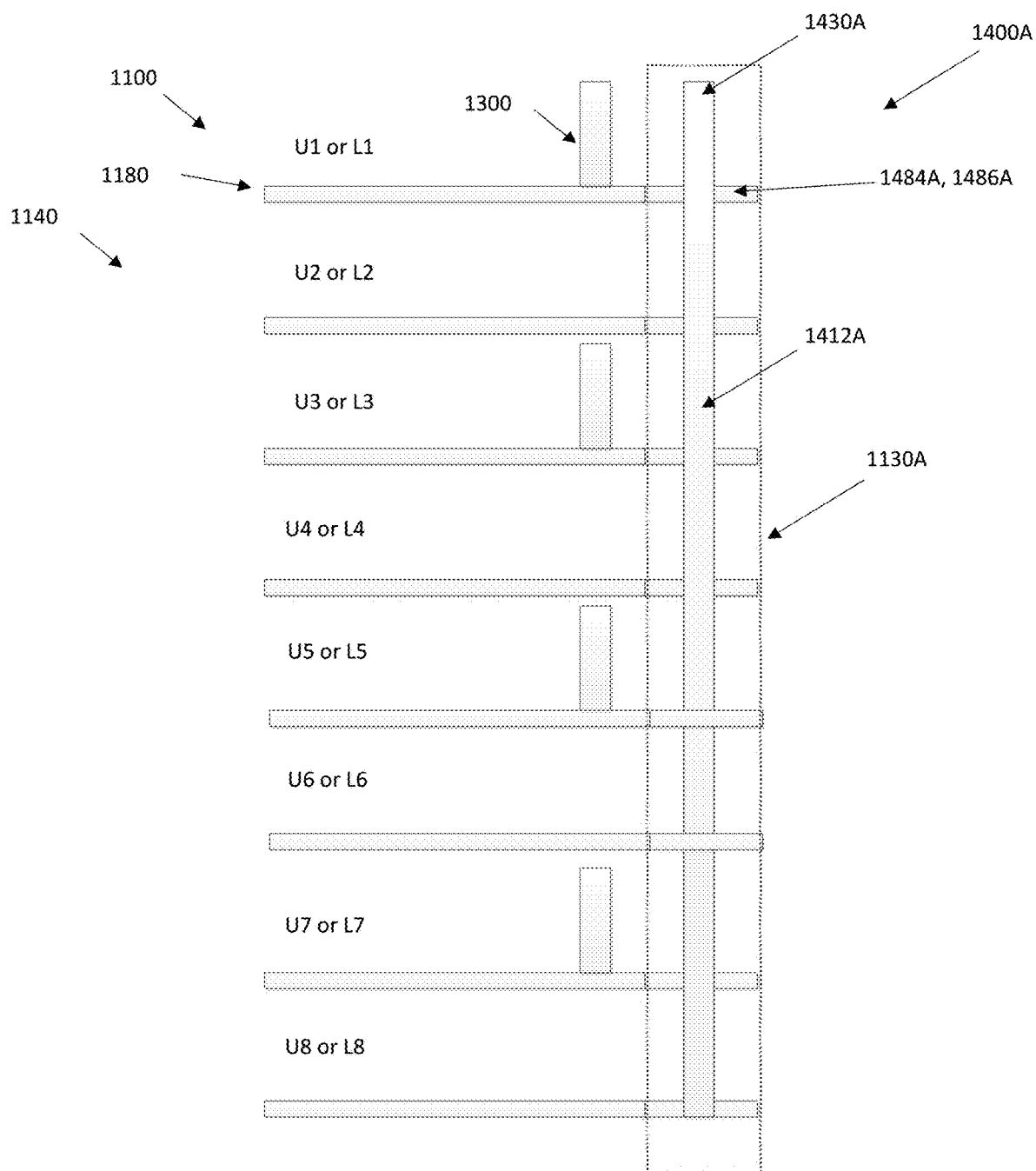
FIG. 21 is a schematic side view of an elevator cage for moving one or more blocks simultaneously via an elevator shaft of an energy storage and delivery system.

FIG. 21 shows a schematic view of an implementation of an elevator cage 1400A that travels within the elevator shaft 1130A of the frame, tower or module 1100. The elevator cage 1400A is similar to the elevator cage 1400 illustrated in FIG. 9 and described above. Thus, reference numerals used to designate the various components of the elevator cage 1400A are identical to those used for identifying the corresponding components of the elevator cage 1400 in FIG. 9, except that an "A" has been added to the end of the numerical identifier. Therefore, the structure and description for the various features of the elevator cage 1400 in FIG. 9 are understood to also apply to the corresponding features of the elevator cage 1400A in FIG. 21, except as described below. In one implementation, the elevator cage 1400A can operate to move blocks 1300 as described above in connection with FIG. 20.

The elevator cage 1400A differs from the elevator cage 1400 in that it is longer (e.g., 30 meters long) and can transport multiple blocks 1300 at one time, whereas the elevator cage 1400 can transport only one block 1300 at a time. Optionally, the elevator cage 1400A has a length that allows it to align with all the rows 1140 in the upper section 1102 simultaneously or align with all the rows 1140 in the lower section 104 of the frame or tower or module 1100 simultaneously.

The elevator cage 1400A has multiple track portions 1484A, 1486A spaced at different vertical locations along the elevator cage 1400A that align with ends of the beams 1180 of multiple floors 1140 of the frame or tower or module 1100. For example, with reference to FIG. 20, where the upper section 1102 has floors U1 to U8, the track portions 1484A, 1486A of the elevator cage 1400A can align with the floors U1 to U8 simultaneously. Similarly, when the elevator cage 1400A moves to the bottom of the frame or tower or module 1100, the track portions 1484A, 1486A can align with the floors L1 to L8 in the lower section 1104 simultaneously. One of skill in the art will recognize that a similar elevator cage 1400A can be provided in the other elevator cage 1130B that aligns with all the rows or floors 1140 simultaneously in the upper section 1102 or aligns with all the rows or floors 1140 simultaneously in the lower section 1104, where blocks 1300 from rows U2, U4, U6 and/or U8 can be moved to rows L2, L4, L6 and/or L8.

With reference to FIG. 21, the elevator cage 1400A can carry more than one block 1300 at a time (e.g., carry two blocks, such as from rows U1 and U3 to rows L1 and L3; carry three blocks, such as from rows U1, U3 and U5 to rows L1, L3 and L5; carry four blocks, such as from rows U1, U3, U5 and U7 to rows L1, L3, L5 and L7, etc.). In another implementation, the elevator cage 1400A can carry one block 1300 at a time (e.g., perform the same process for moving blocks 1300 described above in connection with FIG. 20). Advantageously, the elevator cage 1400A requires less control for alignment with the beams 1180 of the rows or floors 1140 since only two stops are required for the elevator cage 1400A along the elevator shaft 1130A to align the elevator cage 1400A with all rows 1140 that transport blocks 1300—a stop at the top of the frame or tower or module 1100, where the elevator cage 1400A simultaneously aligns with the rows 1140 in the upper section 1102, and a stop at the bottom of the frame or tower or module 1100, where the elevator cage 1400A simultaneously aligns with the rows 1140 in the lower section 1104.

In another implementation, the elevator cage 1400A has a length that allows it to align with fewer than all of the rows 1140 in the upper section 1102 or lower section 104 of the frame or tower or module 1100 simultaneously (e.g., a length that generally coincides with the height of two rows 1140, a length that generally coincides with the height of three rows 1140, a length that generally coincides with the height of four rows 1140, etc.).

Figure 22A:
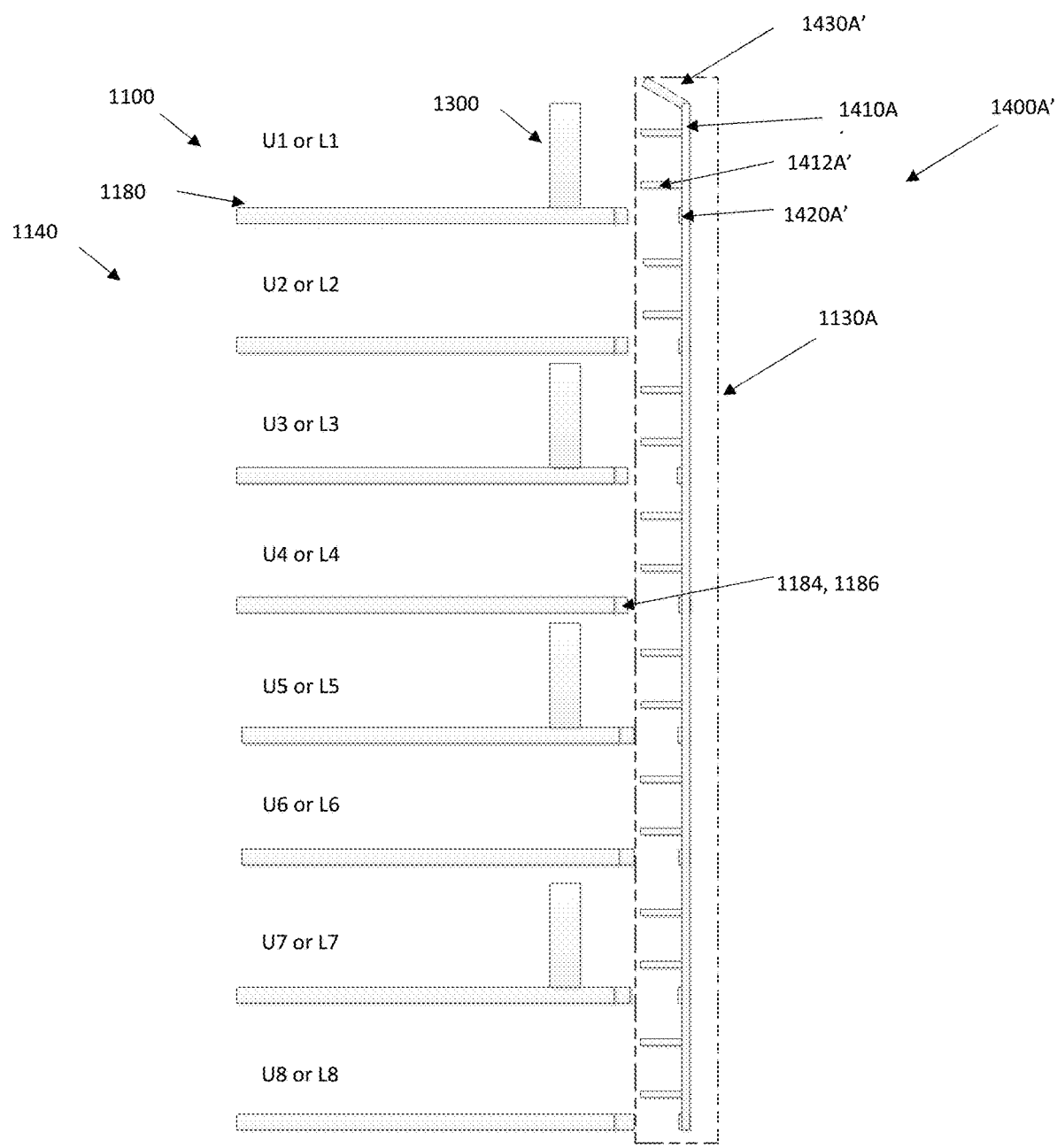
FIGS. 22A-22B is a schematic side view of an elevator cage for moving one or more blocks simultaneously via an elevator shaft of an energy storage and delivery system.
Figure 22B:
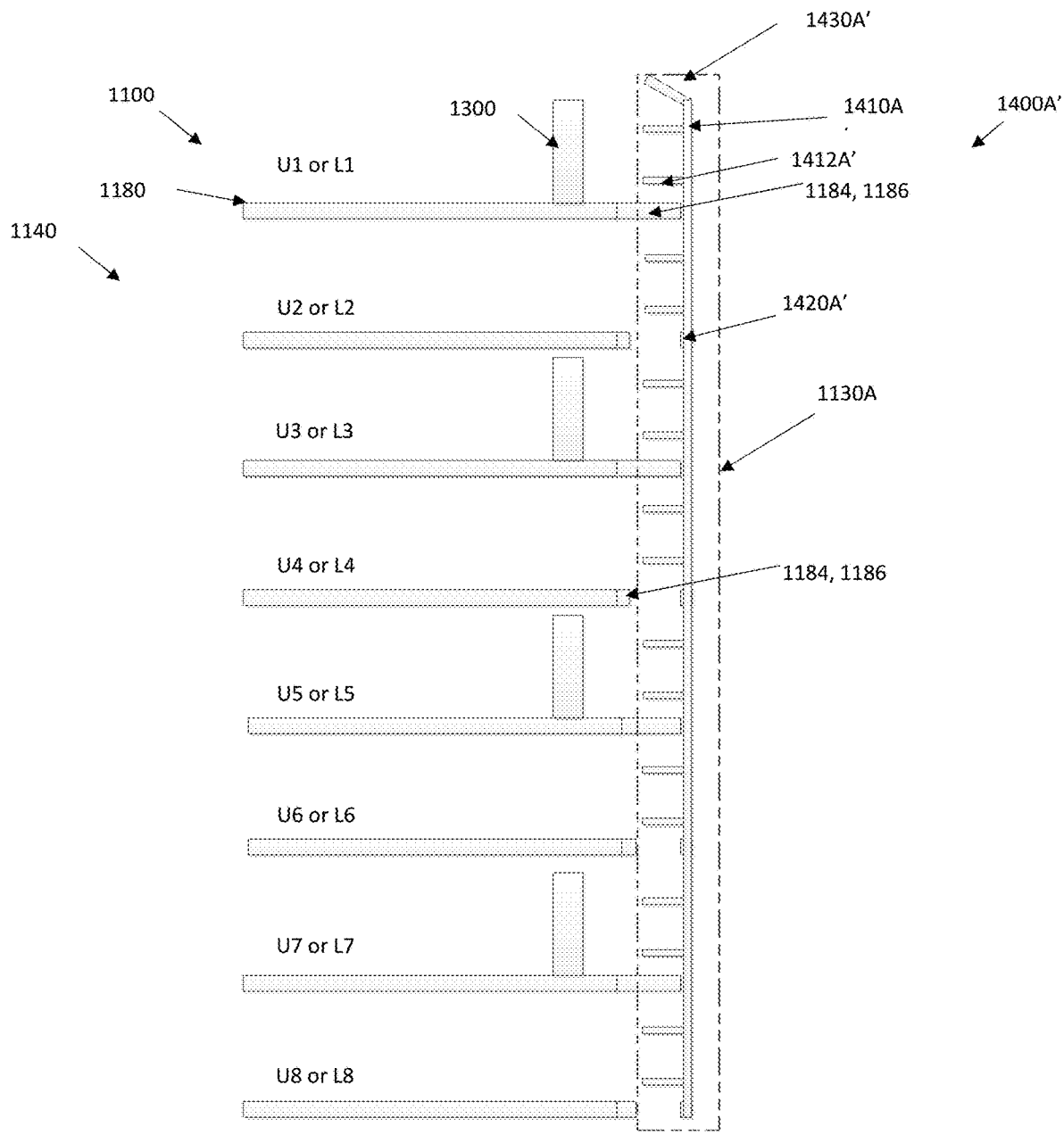

FIGS. 22A-22B shows a schematic view of an implementation of an elevator cage 1400A' that travels within the elevator shaft 1130A of the frame, tower or module 1100. The elevator cage 1400A' is similar to the elevator cage 1400' illustrated in FIGS. 13-19 and described above. Thus, reference numerals used to designate the various components of the elevator cage 1400A' are identical to those used for identifying the corresponding components of the elevator cage 1400' in FIGS. 13-19, except that an "A" has been added to the numerical identifier. Therefore, the structure and description for the various features of the elevator cage 1400' in FIGS. 13-19 are understood to also apply to the corresponding features of the elevator cage 1400A' in FIGS. 22A-22B, except as described below. In one implementation, the elevator cage 1400A' can operate to move blocks 1300 as described above in connection with FIG. 20.

The elevator cage 1400A' differs from the elevator cage 1400' in that it is longer (e.g., 30 meters long) and can transport multiple blocks 1300 at one time, whereas the elevator cage 1400' can transport only one block 1300 at a time. Optionally, the elevator cage 1400A' has a length that allows it to align with all the rows 1140 in the upper section 1102 simultaneously or align with all the rows 1140 in the lower section 104 of the frame or tower or module 1100 simultaneously.

The elevator cage 1400A' has multiple actuatable supports 1420A' spaced at different vertical locations along the elevator cage 1400A' to allow transfer of blocks 1300 from one or more such rows 1140 to the elevator cage 1400A'. FIG. 22A shows the actuatable track portions 1184, 1186 at the end of the beams 1180 for the floors 1140 in the retracted position (e.g., so that they do not protrude into the elevator shaft 1130A), such as when the elevator cage 1400A' is moving past such floors 1140. FIG. 22B shows the actuatable track portions 1184, 1186 at the end of the beams 1180 for one or more floors 1140 in the extended position (e.g., so that they extend into the elevator shaft 1130A) to allow transfer of blocks 1300 in said rows 1140 to the elevator cage 1400A'.

For example, with reference to FIG. 20, where the upper section 1102 has floors U1 to U8, the elevator cage 1400A' can align with the floors U1 to U8 simultaneously. Similarly, when the elevator cage 1400A' moves to the bottom of the frame or tower or module 1100, the elevator cage 1400A' can align with the floors L1 to L8 in the lower section 1104 simultaneously. One of skill in the art will recognize that a similar elevator cage 1400A' can be provided in the other elevator cage 1130B that aligns with all the rows or floors 1140 simultaneously in the upper section 1102 or aligns with all the rows or floors 1140 simultaneously in the lower section 1104, where blocks 1300 from rows U2, U4, U6 and/or U8 can be moved to rows L2, L4, L6 and/or L8.

With reference to FIGS. 22A-22B, the elevator cage 1400A' can carry more than one block 1300 at a time (e.g., carry two blocks, such as from rows U1 and U3 to rows L1 and L3; carry three blocks, such as from rows U1, U3 and U5 to rows L1, L3 and L5; carry four blocks, such as from rows U1, U3, U5 and U7 to rows L1, L3, L5 and L7, etc.). In another implementation, the elevator cage 1400A' can carry one block 1300 at a time (e.g., perform the same process for moving blocks 1300 described above in connection with FIG. 20). Advantageously, the elevator cage 1400A' requires less control for alignment with the beams 1180 of the rows or floors 1140 since only two stops are required for movement of the elevator cage 1400A' in the elevator shaft 1130A to align the elevator cage 1400A' with all rows 1140 that transport blocks 1300—a stop at the top of the frame or tower or module 1100, where the elevator cage 1400A' simultaneously aligns with the rows 1140 in the upper section 1102, and a stop at the bottom of the frame or tower or module 1100, where the elevator cage 1400A' simultaneously aligns with the rows 1140 in the lower section 1104.

In another implementation, the elevator cage 1400A' has a length that allows it to align with fewer than all of the rows 1140 in the upper section 1102 or in the lower section 104 of the frame or tower or module 1100 simultaneously (e.g., a length that generally coincides with the height of two rows 1140, a length that generally coincides with the height of three rows 1140, a length that generally coincides with the height of four rows 1140, etc.).

The block 130, 1300 can optionally weigh between approximately 20 tons and 50 tons, such as approximately 30 tons (e.g., 30 metric tons). However, in other examples, the block 130, 1300 can weigh other suitable amounts.

The block 130, 1300 can include a ballast mass (e.g., load-bearing filler material), for example enclosed in the shell. In one example, the ballast mass is of a different material than the material of the shell. For example, the ballast mass or load-bearing filler material can be soil, coal, fly ash, debris, demolition material, gravel, building waste and/or recycled material mixed with and/or pressed with low-grade or inexpensive concrete, as discussed below. This advantageously reduces the cost of manufacturing the block 130, 1300 and provides a mechanism for dispensing of material (e.g., demolition material, building waste, debris, etc.) that would otherwise be sent to a landfill. In another example, the ballast mass and shell are of the same material (e.g., define a monolithic or single mass without any boundaries or seams). Advantageously, the block 130, 1300 can be manufactured with materials available near the location of the system 1000, 1000', 1000''. Optionally, the block 130, 1300 can be reinforced (e.g., with steel), such as with one or more reinforcement layers of mesh steel or rebar (e.g., structural steel).

The block 130, 1300 can optionally be made at least in part of concrete (e.g., the shell of the block 130, 1300 can be made of concrete). Advantageously, because concrete has a higher density than water, the volume of the block 130, 1300 can store more potential energy than a corresponding volume of water. In one example, at least a portion of the block 130, 1300 can be made of low grade concrete (e.g., having a compression strength lower than 10 MPa, such as 3-8 MPa).

The energy storage and delivery system 100, 1000, 1000', 1000'' is operable to convert electrical energy or electricity into potential energy for storage by lifting (e.g., vertically lifting) the blocks 130, 1300 from a lower elevation to a higher elevation, and to convert potential energy into electrical energy or electricity by moving (e.g., vertically moving, vertically lowering) one or more of the blocks 130, 1300 from a higher elevation to a lower elevation via gravity.

The electric motor-generator 1500 can operate the elevator cage 1400, 1400', 1400A, 1400A' to lift (e.g., vertically lift) one or more of the blocks 130, 1300 from a lower elevation and place the blocks 130, 1300 at a higher elevation. Each of the blocks 130, 1300 at the higher elevation stores an amount of potential energy corresponding to (e.g., proportional to) its mass and height differential between the lower elevation and the higher elevation of the block 130, 1300 (e.g., potential energy=mass×gravity×height above reference surface, such as ground level). The heavier the blocks 130, 1300 and the higher they are raised, the more potential energy can be stored.

To convert the stored potential energy to electricity, the elevator cage 1400, 1400', 1400A, 1400A' can move one or more of the blocks 130, 1300 from a higher elevation to a lower elevation (e.g., vertically lower at least partially under the force of gravity) to drive the electric motor-generator 1500 (via one or more cables or steel ribbons) to generate electricity, which can be delivered to a power grid to which the motor-generator 1500 is electrically connected. Power in the form of electricity is generated each time a block 130, 1300 is lowered.

Advantageously, the energy storage and delivery system 100, 1000, 1000', 1000'' can, for example, store electricity generated from solar power as potential energy in the raised blocks 130, 1300 during daytime hours when solar power is available, and can convert the potential energy in the blocks 130, 1300 into electricity during nighttime hours when solar energy is not available by lowering one or more blocks 130, 1300 and deliver the converted electricity to the power grid.

Described herein are examples of an energy storage and delivery system (e.g., the energy storage and delivery system 100, 1000, 1000', 1000'') operable to convert electrical energy or electricity into potential energy for storage, and to convert potential energy into electrical energy or electricity, for example, for delivery to an electrical grid. Advantageously, the energy storage system requires little to no maintenance, and can operate decades (e.g., 30-50 years) with substantially no reduction in energy storage capacity.

In some implementations, the energy storage system described herein can store approximately 10 megawatts-hour (MWh) or more of energy (e.g., between 10 MWh and 100 MWh, such as 15 MWh, 20 MWh, 30 MWh, 50 MWh, 80 MWh, 90 MWh) and deliver approximately 10 MWh or more of energy (e.g., between 10 MWh and 100 MWh, such as 15 MWh, 20 MWh, 30 MWh, 50 MWh, 80 MWh, 90 MWh) to the electrical grid. The energy storage system described herein can deliver energy each hour (e.g., 1 MW up to 6 MW or more). However, in other implementations the energy storage and delivery system described herein can have other suitable energy storage and delivery capacities (e.g., 1 MWh, 3 MWh, 5 MWh, etc.). In one implementation, the energy storage and delivery system can optionally power approximately 1000 homes or more for a day.

The energy storage and delivery system described herein can advantageously be connected to a renewable energy (e.g., green energy) power generation system, such as, for example, a solar power energy system, a wind energy power system (e.g., wind turbines), etc. Advantageously, during operation of the renewable energy power generation system (e.g., operation of the solar energy system during daylight hours, operation of the wind power system during windy conditions), the energy storage and delivery system captures the electricity generated by the renewable energy power generation system. The energy storage and delivery system can later deliver the stored electricity to the electrical grid when the renewable energy power generation system is not operable (e.g., at night time, during windless conditions). Accordingly, the energy storage and delivery system operates like a battery for the renewable energy power generation system and can deliver off-hours electricity from a renewable energy power generation system to the electrical grid.

In implementations described above, the energy storage and delivery system 100, 1000, 1000', 1000'' lifts blocks 130, 1300 to store electrical energy as potential energy and lowers blocks 130, 1300 to generate electricity. In one implementation, the elevator cage 1400, 1400', 1400A, 1400A' can be operated with excess power from an electricity grid. The amount of energy recovered by the energy storage system 100, 1000, 1000', 1000'' for every unit of energy used to lift the blocks 130, 1300 can optionally be 80-90%.

Additional Embodiments

In embodiments of the present invention, an energy storage system, and method of operating the same, and elevator cage for use in the same, may be in accordance with any of the following clauses:

Clause 1: An energy storage and delivery system, comprising:
one or more modules, each module comprising
a plurality of blocks, and a frame having a vertical height above a foundation defined by a plurality of rows that extend horizontally, the frame including
an upper section having a first set of rows, each of the first set of rows configured to receive and support a plurality of blocks thereon,
a lower section having a second set of rows, each of the second set of rows configured to receive and support a plurality of blocks thereon,
an intermediate section between the upper section and the lower section that is free of blocks,
a pair of elevator shafts disposed on opposite ends of the plurality of rows, and
an elevator cage movably disposed in each of the pair of elevator shafts and operatively coupled to an electric motor-generator, the elevator cage sized to receive and support one or more blocks therein,
wherein the elevator cage in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage in each of the pair of elevator shafts is operable to move one or more blocks from alternating rows of the first set of rows to corresponding alternating rows of the second set of rows under a force of gravity to generate an amount of electricity, the elevator cage moving said blocks between each of the second set of rows and each of the corresponding first set of rows along a same vertical distance.

Clause 2: The system of clause 1, wherein the intermediate section is configured to house one or more vertical farming units.

Clause 3: The system of any preceding clause, wherein the elevator cage in each of the pair or elevator shafts is operable to move the blocks between the first set of rows and the second set of rows so that the average distribution of load on the foundation of the module remains substantially constant.

Clause 4: The system of any preceding clause, wherein the frame includes a plurality of columns defined by one or more pillars that support beams thereon, each pair of beams defining a row in the first and second set of rows that extends orthogonal to the columns, the beams configured to support the blocks on a top surface thereof, each beams having a longitudinal channel below the top surface.

Clause 5: The system of clause 4, further comprising a plurality of cross-members that extend between the columns and provide diagonal bracing therebetween along a length of the rows.

Clause 6: The system of clause 4, wherein each row in one or both of the first set of rows and the second set of rows includes a trolley movably coupled between the pair of beams that define the row, the trolley configured to extend between the channels of the pair of beams that define the row and travel below the blocks disposed on the pair of beams that define the row, the trolley operable to lift a block above the pair of beams and to move said block horizontally along the row.

Clause 7: The system of clause 6, wherein the trolley comprises wheel assemblies that extend within the channel of the pair of beams, a frame that extends between the pair of beams, and support pistons operable to lift the block above the pair of beams for horizontal movement of the block along the row and operable to lower the block onto the pair of beams to fix a position of the block on the row.

Clause 8: The system of clause 6, wherein the elevator cage comprises a pair of track portions configured to align with the pair of beams of a row such that the trolley travels from the pair of beams to the pair of track portions to deliver the block to the elevator cage.

Clause 9: The system of clause 8, wherein trolley delivers the block onto a top surface of the pair of track portions and exits the elevator cage before the elevator cage moves the block along the elevator shaft.

Clause 10: The system of clause 6, further comprising actuatable track portions movably coupled to ends of the beams proximate the elevator shafts, the track portions actuatable between a retracted position where they extend orthogonal to the beams and an extended position where they extend in-line with the beams and extend into a space of the elevator shafts, wherein in the extended position the track portions can receive the trolley therebetween for positioning of a block on a surface of the track portions for transfer to the elevator cage.

Clause 11: The system of clause 10, wherein the elevator cage includes a frame defining a rear support, side arms that extend from the rear support, and one or more actuatable supports actuatable between a retracted position substantially aligned with a plane of the rear support and an extended position transverse to the plane of the rear support, the one or more actuatable supports when in the extended position configured to lift the block from the actuatable track portions and to support the block thereon during motion of the elevator cage in the elevator shaft.

Clause 12: The system of clause 11, wherein the one or more actuatable supports are a pair of actuatable supports that in the extended position extend transverse to the rear support and are configured to support the block thereon during motion of the elevator cage in the elevator shaft.

Clause 13: The system of any preceding clause, wherein the one or more modules are four modules in a square arrangement in plan view so that the rows of each module extend orthogonal to the rows in adjacent modules to thereby provide the four modules with automatic bracing against wind and seismic forces.

Clause 14: The system of any preceding clause, wherein the one or more modules are two modules arranged in-line so that the rows of each module are substantially aligned.

Clause 15: An energy storage and delivery system, comprising:
a plurality of blocks, and
a frame having a vertical height above a foundation defined by a plurality of rows that extend horizontally, the frame including
an upper section having a first set of rows, each of the first set of rows configured to receive and support a plurality of blocks thereon,
a lower section having a second set of rows, each of the second set of rows configured to receive and support a plurality of blocks thereon,
an intermediate section between the upper section and the lower section that is free of blocks,
a pair of elevator shafts disposed on opposite ends of the plurality of rows;
a trolley movably coupled to each row in one or both of the first set of rows and the second set of rows, the trolley operable to travel beneath the blocks in the row and configured to lift a block for movement of said block horizontally along the row; and an elevator cage movably disposed in each of the pair of elevator shafts and operatively coupled to an electric motor-generator, the elevator cage sized to receive a block from a row via the trolley and to support the block therein while moving along the elevator shaft,
wherein the elevator cage in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage in each of the pair of elevator shafts is operable to move one or more of the blocks from alternating rows of the first set of rows to corresponding alternating rows of the second set of rows under a force of gravity to generate an amount of electricity, the elevator cage moving said blocks between each of the second set of rows and each of the corresponding first set of rows along a same vertical distance.

Clause 16: The system of clause 15, wherein the intermediate section is configured to house one or more vertical farming units.

Clause 17: The system of any of clauses 15-16, wherein the elevator cage in each of the pair or elevator shafts is operable to move the blocks between the first set of rows and the second set of rows so that the average distribution of load on the foundation of the module remains substantially constant.

Clause 18: The system of any of clauses 15-17, wherein each row in one or both of the first set of rows and the second set of rows is defined by a pair of beams, the trolley movably coupled between the pair of beams.

Clause 19: The system of clause 18, wherein the elevator cage comprises a pair of track portions configured to align with the pair of beams of a row such that the trolley travels from the pair of beams to the pair of track portions to deliver the block to the elevator cage for movement along the elevator shaft.

Clause 20: The system of clause 18, further comprising actuatable track portions movably coupled to ends of the beams proximate the elevator shafts, the track portions actuatable between a retracted position where they extend orthogonal to the beams and an extended position where they extend in-line with the beams and extend into a space of the elevator shafts, wherein in the extended position the track portions can receive the trolley therebetween for positioning of a block on a surface of the track portions for transfer to the elevator cage.

Clause 21: The system of clause 20, wherein the elevator cage includes a frame defining a rear support, side arms that extend from the rear support, and a pair of actuatable supports actuatable between a retracted position substantially aligned with a plane of the rear support and an extended position transverse to the plane of the rear support, the pair of actuatable supports when in the extended position configured to lift the block from the actuatable track portions and to support the block thereon during motion of the elevator cage in the elevator shaft.

Clause 22: A method for storing and generating electricity via an energy storage and delivery system of any preceding clause, comprising:
operating a pair of elevator cages on opposite ends of a plurality of rows of a frame to move a plurality of blocks between a first set of rows in an upper section of the frame and a corresponding second set of rows in a lower section of the frame disposed below an intermediate section of the frame that is free of the blocks,
wherein operating the pair of elevator cages includes
moving with the pair of elevator cages one or more of the blocks from alternating rows of the second set of rows to corresponding alternating rows of the first set of rows to store and amount of electrical energy corresponding to a potential energy amount of said blocks; and
moving with the pair of elevator cages one or more of the blocks from alternating rows of the first set of rows to corresponding alternating rows of the second set of rows under a force of gravity to generate an amount of electricity via an electric motor-generator electrically coupled to the elevator cages, the elevator cages moving said blocks between each of the second set of rows and each of the corresponding first set of rows by an equal vertical distance.

Clause 23: The method of clause 22, wherein moving the one or more blocks from alternating rows of the second set of rows to corresponding alternating rows of the first set of rows or moving the one or more blocks from alternating rows of the first set of rows to corresponding alternating rows of the second set of rows includes positioning the blocks so that the average distribution of load on a foundation of the frame remains substantially constant.

Clause 24: The method of any of clauses 22-23, wherein moving the one or more blocks from alternating rows of the second set of rows to corresponding alternating rows of the first set of rows includes sequentially moving a block from each of the alternating rows of the second set of rows to the corresponding alternating rows of the first set of rows before returning to a first of the alternating rows of the second set of rows.

Clause 25: The method of any of clauses 22-24, wherein moving the one or more blocks from alternating rows of the first set of rows to corresponding alternating rows of the second set of rows includes sequentially moving a block from each of the alternating rows of the first set of rows to the corresponding alternating rows of the second set of rows before returning to a first of the alternating rows of the first set of rows.

Clause 26: The method of any of clauses 22-25, wherein moving the one or more blocks from alternating rows of the second set of rows to corresponding alternating rows of the first set of rows includes simultaneously moving a block from each of the alternating rows of the second set of rows to the corresponding alternating rows of the first set of rows.

Clause 27: The method of any of clauses 22-26, wherein moving the one or more blocks from alternating rows of the first set of rows to corresponding alternating rows of the second set of rows includes simultaneously moving a block from each of the alternating rows of the first set of rows to the corresponding alternating rows of the second set of rows.

Clause 28: The method of any of clauses 22-27, wherein moving the one or more of the plurality blocks from alternating rows of the second set of rows to corresponding alternating rows of the first set of rows includes horizontally moving the one or more blocks along the one or more rows of the second set of rows with a trolley that travels under the blocks and selectively lifts the blocks above beams of the rows to deliver the one or more blocks to the elevator cages.

Clause 29: The method of clause 28, wherein delivering the one or more blocks with the trolley to the elevator cages includes aligning track portions of the elevator cages with the beams of the one or more rows of the second set of rows to allow the trolley to travel onto the elevator cage to deliver the one or more blocks onto the track portions.

Clause 30: The method of clause 28, wherein delivering the one or more blocks with the trolley to the elevator cages includes actuating cantilevered track portions movably coupled to ends of the beams, the track portions actuatable between a retracted position where they extend orthogonal to the beams and an extended position where they extend in-line with the beams to allow the trolley to travel from the beams to the track portions.

Clause 31: The method of clause 30, wherein delivering the one or more blocks with the trolley to the elevator cages includes generally aligning the elevator cage with the block disposed on the cantilevered track portions and actuating supports of the elevator cage into an extended position under a bottom of the block, thereby allowing the elevator cage to lift the block off the cantilevered track portions.

Clause 32: The method of any of clauses 22-31, wherein moving the one or more of the plurality of blocks from alternating rows of the first set of rows to corresponding alternating rows of the second set of rows includes horizontally moving the one or more blocks along the one or more rows of the second set of rows with a trolley that travels under the blocks and selectively lifts the blocks above beams of the row to deliver the one or more blocks to the elevator cages.

Clause 33: The method of clause 32, wherein delivering the one or more blocks with the trolley to the elevator cages includes aligning track portions of the elevator cages with the beams of the one or more rows of the second set of rows to allow the trolley to travel onto the elevator cage to deliver the one or more blocks onto the track portions.

Clause 34: The method of clause 32, wherein delivering the one or more blocks with the trolley to the elevator cages includes actuating cantilevered track portions movably coupled to ends of the beams, the track portions actuatable between a retracted position where they extend orthogonal to the beams and an extended position where they extend in-line with the beams to allow the trolley to travel from the beams to the track portions.

Clause 35: The method of clause 34, wherein delivering the one or more blocks with the trolley to the elevator cages includes generally aligning the elevator cage with the block disposed on the cantilevered track portions and actuating supports of the elevator cage into an extended position under a bottom of the block, thereby allowing the elevator cage to lift the block off the cantilevered track portions.

Clause 36: A method for storing and generating electricity with an energy storage and delivery system of any preceding claim, comprising:
  horizontally moving one or more blocks along alternating rows of a first set of rows in an upper section of a frame with a trolley toward elevator cages on opposite ends of the rows; and
  operating the elevator cages to vertically move the one or more blocks past an intermediate section of the frame to corresponding alternating rows of a second set of rows of the frame under a force of gravity to generate an amount of electricity via an electric motor-generator electrically coupled to the elevator cages, the elevator cages moving said blocks between the alternating rows of the first set of rows and each of the corresponding alternating second set of rows by an equal vertical distance.

Clause 37: The method of clause 36, further comprising operating the elevator cages to vertically move the one or more blocks from alternating rows in the second set of rows and past an intermediate section of the frame to corresponding alternating rows of the first set of rows of the frame to store and amount of electrical energy corresponding to a potential energy amount of said blocks.

Clause 38: The method of clause 37, wherein moving the one or more blocks from alternating rows of the second set of rows to corresponding alternating rows of the first set of rows or moving the one or more blocks from alternating rows of the first set of rows to corresponding alternating rows of the second set of rows includes positioning the blocks so that the average distribution of load on a foundation of the frame remains substantially constant.

Clause 39: The method of any of clauses 36-38, wherein moving the one or more blocks from alternating rows of the first set of rows to corresponding alternating rows of the second set of rows includes sequentially moving a block from each of the alternating rows of the first set of rows to the corresponding alternating rows of the second set of rows before returning to a first of the alternating rows of the first set of rows.

Clause 40: The method of any of clauses 36-39, wherein moving the one or more blocks from alternating rows of the first set of rows to corresponding alternating rows of the second set of rows includes simultaneously moving a block from each of the alternating rows of the first set of rows to the corresponding alternating rows of the second set of rows.

Clause 41: The method of any of clauses 36-40, wherein horizontally moving the one or more blocks with the trolley includes lifts the blocks above beams of the rows.

Clause 42: An energy storage and delivery system, comprising:
  a plurality of blocks;
  a frame extending between a bottom end of the frame and one or more rails at a top end of the frame, the frame having a plurality of columns between the bottom end and the top end, each column configured to movably support a set of the blocks between a front pillar of the column and a rear pillar of the column at different vertical locations of the column via one or more posts attached to the front and rear pillars that engage corresponding posts of the blocks such that the blocks in a column are maintained spaced from each other;
  one or more cranes movably mounted to the one or more rails and configured to travel horizontally along the rails over one of more of the columns; and
  an electric-motor generator electrically coupled to the one or more cranes,
  wherein the one or more cranes are operable to couple to one or more of the blocks in a column to move said one or more blocks from a lower elevation of the column to a higher elevation of the column to store an amount of electrical energy corresponding to a potential energy amount of said one or more blocks, and to move said one or more blocks from a higher elevation of the column to a lower elevation of the column under a force of gravity to generate an amount of electricity via the electric motor-generator, wherein the vertical distance between the lower elevation and the higher elevation each of the blocks is the same.

Clause 43: The system of clause 42, further comprising one or more footings at the bottom of the frame.

Clause 44: The system of any of clauses 42-43, wherein the one or more posts attached to the front and rear pillars are actuatable between an extended position to engage the posts of the block to retain the block in a fixed position in the column, and a retracted position to disengage the posts of the block to allow the block to be moved vertically by the crane without interference from the posts of the pillars.

Clause 45: The system of any of clauses 42-44, wherein the one or more posts attached to the front and rear pillars are fixed, the crane configured to couple to a block in the column and lift the block to disengage the posts of the block from the posts of the pillars, configured to laterally displace the block relative to the pillars so the posts of the block are clear of the posts of the pillars, vertically displace the block to a desired location, laterally displace the block in an opposite direction to align the posts of the block with the posts of the pillars, and lower the block so that the posts of the block engage the posts of the pillars.

Clause 46: The system of any of clauses 42-45, wherein the blocks are shipping containers.

Clause 47: The system of any of clauses 42-46, wherein the blocks only move vertically.

Clause 48: The system of any of clauses 42-47, further comprising cross-members that interconnect the pillars to provide the frame with lateral stability.

Clause 49: The system of clause 48, wherein the cross-members are cables.

Clause 50: The system of any of clauses 42-49, wherein the one or more cranes couple to the one or more blocks via a grabber mechanism operatively coupled to the crane via one or more cables.

Clause 51: The system of any of clauses 42-50, wherein the one or more cranes are a pair of bridge cranes movably coupled to the rails.

Clause 52: A method for storing and generating electricity with an energy storage and delivery system of any preceding claim, comprising:
    operating a crane movably mounted to one or more rails at a top of a frame to move a plurality of blocks between a lower elevation of a column of the frame and a higher elevation of the column, a vertical distance between the lower elevation and the higher elevation of each of the blocks being the same,
    wherein operating the crane includes
        coupling the crane to one or more of the blocks in a column of the frame and moving said one or more blocks from the lower elevation of the column to the higher elevation of the column to store an amount of electrical energy corresponding to a potential energy amount of said one or more blocks; and
        coupling the crane to one or more of the blocks in the column of the frame and moving said one or more blocks from the higher elevation of the column to the lower elevation of the column under a force of gravity to generate an amount of electricity via an electric motor-generator electrically connected to the crane.

Clause 53: The method of clause 52, wherein moving said one or more blocks from the lower elevation to the higher elevation or from the higher elevation to the lower elevation includes only moving the blocks vertically.

Clause 54: The method of any of clauses 52-53, wherein moving said one or more blocks from the lower elevation to the higher elevation or from the higher elevation to the lower elevation includes retracting one or more posts movably couple to pillars of the column to allow the block to move unobstructed in a vertical direction along the column.

Clause 55: The method of any of clauses 52-54, wherein moving said one or more blocks from the lower elevation to the higher elevation or from the higher elevation to the lower elevation includes lifting the one or more blocks with the crane to disengage posts of the block from posts of the column, laterally displace the block relative to the column so the posts of the block are clear of the posts of the column, vertically displace the block to a desired location, laterally displace the block in an opposite direction to align the posts of the block with the posts of the column, and lowering the block so that the posts of the block engage the posts of the pillars to fixedly support the block at the desired location.

Clause 56: The method of any of clauses 52-55, wherein moving said one or more blocks from the lower elevation to the higher elevation or from the higher elevation to the lower elevation includes moving one block at a time between the lower elevation and the higher elevation.

Clause 57: The method of any of clauses 52-56, wherein moving said one or more blocks from the lower elevation to the higher elevation or from the higher elevation to the lower elevation includes moving multiple blocks at a time between the lower elevation and the higher elevation, the blocks spaced apart from each other.

Clause 58: The method of any of clauses 52-57, wherein the blocks are shipping containers.

Clause 59: The method of any of clauses 52-58, wherein the crane is a bridge crane.

Clause 60: An elevator cage for use in an energy storage and delivery system of any preceding claim to move blocks between a lower elevation of a tower and a higher elevation of a tower to store energy and to move blocks between a higher elevation of the tower and a lower elevation of the tower under force of gravity to generate electricity, the elevator cage comprising:
    a top support;
    a pair of side supports attached to and extending transverse to the top support;
    a bottom support attached to and extending transverse to the pair of side supports, the top support, pair of side supports and bottom support defining an opening generally corresponding with a shape of the block; and
    one or more pairs of track portions attached to the pair of side supports and extending transverse to the side supports, each of the one or more pair of track portions configured to align with a pair of beams of a row in the tower to allow transfer of a block from the pair of beams to the pair of track portions.

Clause 61: The elevator cage of clause 60, wherein the rectangular opening is a square opening.

Clause 62: The elevator cage of any of clauses 60-61, wherein the top support, bottom support and pair of side supports define an front opening and a rear opening in the elevator cage.

Clause 63: The elevator cage of any of clauses 60-62, wherein the bottom support comprises one or more rails.

Clause 64: The elevator cage of any of clauses 60-63, wherein each of pair of the side supports comprises one or more rails.

Clause 65: The elevator cage of any of clauses 60-64, wherein the one or more pairs of track portions are a plurality of pairs of track portions spaced vertically apart from each other so that each pair of track portions aligns with the pair of beams of a row of the frame, each of the plurality of pairs of track portions configured to support a block thereon.

Clause 66: The elevator cage of any of clauses 60-65, wherein the one or more pairs of track portions is one pair of track portions.

Clause 67: The elevator cage of any of clauses 60-66, wherein each track portion of the one or more pair of track portions has a longitudinal channel between a top surface and a bottom surface of the track portion, the longitudinal channels of the one or more pairs of track portions configured to align with corresponding channels of the beams to facilitate transfer of a block between the beams and the track portions.

Clause 68: An elevator cage for use in an energy storage and delivery system of any preceding claim to move blocks between a lower elevation of a tower and a higher elevation of a tower to store energy and to move blocks between the higher elevation of the tower and the lower elevation of the tower under force of gravity to generate electricity, the elevator cage comprising:
- a top support;
- a frame that includes a rear support that extends along a plane and one or more side arms attached to the rear support and that extend transverse to the rear support; and
- one or more actuatable supports movably coupled to the rear support and configured to move between a retracted position where the one or more actuatable supports extend transversely relative to the side arms and an extended position where the one or more actuatable supports extend transversely relative to the plane of the rear support, the one or more actuatable supports in the extended position configured to support a bottom of a block thereon when the block is adjacent the rear support.

Clause 69: The elevator cage of clause 68, wherein the one or more actuatable supports are a pair of actuatable supports that in the extended position are configured to contact and support a bottom of a block.

Clause 70: The elevator cage of any of clauses 68-69, wherein the one or more actuatable supports are a plurality of pairs of actuatable supports spaced vertically apart from each other so that each pair of actuatable supports generally aligns with a pair of beams of a row of the frame, each of the plurality of pairs of actuatable supports configured to support a block thereon.

Clause 71: The system of any of clauses 68-70, wherein the one or more side arms are one or more pairs of side arms, each pair of side arms extending from opposite sides of the rear support.

Clause 72: The system of any of clauses 68-71, wherein the rear support has a rectangular shape.

Clause 73: The system of any of clauses 68-72, wherein the rear support has a square shape.

Clause 74: The system of any of clauses 68-73, wherein the rear support has a shape generally corresponding to a shape of the block.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An elevator cage for use in an energy storage and delivery system to move blocks between a lower elevation of a tower and a higher elevation of the tower to store energy and to move blocks between a higher elevation of the tower and a lower elevation of the tower under force of gravity to generate electricity, the elevator cage comprising:
    a top support;
    a pair of side supports attached to and extending transverse to the top support;
    a bottom support attached to and extending transverse to the pair of side supports, the top support, pair of side supports and bottom support defining an opening generally corresponding with a shape of the block; and
    one or more pairs of track portions attached to the pair of side supports and extending transverse to the side supports, each of the one or more pair of track portions configured to align with a pair of beams of a row in the tower to allow a trolley to travel via the track portions into a space of the elevator cage defined between the top support, bottom support and pair of side supports to transfer a block from the pair of beams to the pair of track portions.

2. The elevator cage of claim 1, wherein the opening is a square opening.

3. The elevator cage of claim 1, wherein the top support, bottom support and pair of side supports define a front opening and a rear opening in the elevator cage.

4. The elevator cage of claim 1, wherein the bottom support comprises one or more rails.

5. The elevator cage of claim 1, wherein each of pair of the side supports comprises one or more rails.

6. The elevator cage of claim 1, wherein the one or more pairs of track portions are a plurality of pairs of track portions spaced vertically apart from each other so that each pair of track portions aligns with the pair of beams of a row of the tower, each of the plurality of pairs of track portions configured to support a block thereon.

7. The elevator cage of claim 1, wherein the one or more pairs of track portions is one pair of track portions.

8. The elevator cage of claim 1, wherein each track portion of the one or more pair of track portions has a longitudinal channel between a top surface and a bottom surface of the track portion, the longitudinal channels of the one or more pairs of track portions configured to align with corresponding channels of the beams to facilitate transfer of the block between the beams and the track portions.

9. An elevator cage for use in an energy storage and delivery system to move blocks between a lower elevation of a tower and a higher elevation of the tower to store energy and to move blocks between the higher elevation of the tower and the lower elevation of the tower under force of gravity to generate electricity, the elevator cage comprising:
    a top support;
    a frame that includes a rear support that extends along a plane and one or more side arms attached to the rear support and that extend transverse to the rear support; and
    one or more actuatable supports pivotally coupled to the rear support and configured to pivot relative to the rear support between a retracted position where the one or more actuatable supports extend transversely relative to the side arms and an extended position where the one or more actuatable supports extend transversely relative to the plane of the rear support, the one or more actuatable supports in the extended position configured to support a bottom of a block thereon when the block is adjacent the rear support.

10. The elevator cage of claim 9, wherein the one or more actuatable supports are a pair of actuatable supports that in the extended position are configured to contact and support a bottom of a block.

11. The elevator cage of claim 9, wherein the one or more actuatable supports are a plurality of pairs of actuatable supports spaced vertically apart from each other so that each pair of actuatable supports generally aligns with a pair of beams of a row of the frame, each of the plurality of pairs of actuatable supports configured to support a block thereon.

12. The system of claim 9, wherein the one or more side arms are one or more pairs of side arms, each pair of side arms extending from opposite sides of the rear support.

13. The system of claim 9, wherein the rear support has a rectangular shape.

14. The system of claim 13, wherein the rear support has a square shape.

15. The system of claim 9 wherein the rear support has a shape generally corresponding to a shape of the block.

* * * * *